United States Patent
Fujii et al.

(10) Patent No.: US 9,044,879 B2
(45) Date of Patent: Jun. 2, 2015

(54) PRODUCTION METHOD OF WAFER LENS

(75) Inventors: Yuiti Fujii, Hachioji (JP); Shigeru Hosoe, Hino (JP); Toshiya Takitani, Sakai (JP); Akihiro Fujimoto, Hino (JP)

(73) Assignee: Konica Minolta Opto, Inc., Tokyo (JP)

( * ) Notice: Subject to any disclaimer, the term of this patent is extended or adjusted under 35 U.S.C. 154(b) by 596 days.

(21) Appl. No.: 13/392,817

(22) PCT Filed: Aug. 23, 2010

(86) PCT No.: PCT/JP2010/064157
§ 371 (c)(1),
(2), (4) Date: Feb. 27, 2012

(87) PCT Pub. No.: WO2011/024745
PCT Pub. Date: Mar. 3, 2011

(65) Prior Publication Data
US 2012/0153516 A1    Jun. 21, 2012

(30) Foreign Application Priority Data
Aug. 31, 2009   (JP) ................ 2009-200168

(51) Int. Cl.
| B29D 11/00 | (2006.01) |
| B29C 39/00 | (2006.01) |
| B29C 39/10 | (2006.01) |
| B29C 39/24 | (2006.01) |
| B29L 11/00 | (2006.01) |

(52) U.S. Cl.
CPC ............... *B29C 39/006* (2013.01); *B29C 39/10* (2013.01); *B29C 39/24* (2013.01); *B29L 2011/0016* (2013.01)

(58) Field of Classification Search
USPC ............. 264/1.36, 1.1, 1.24, 1.25, 1.26, 1.31, 264/1.32, 1.33, 1.34, 1.38, 1.6, 1.7, 1.8, 1.9, 264/2.2, 2.3, 2.4, 2.5, 2.6, 2.7
See application file for complete search history.

(56) References Cited

U.S. PATENT DOCUMENTS

| 2004/0108210 A1* | 6/2004 | Yagi et al. ................ 205/70 |
| 2006/0259546 A1 | 11/2006 | Rudmann et al. |
| 2010/0270705 A1* | 10/2010 | Okushima et al. ........... 264/293 |

FOREIGN PATENT DOCUMENTS

| JP | 2003-033926 | 2/2003 |
| JP | 2007-137051 | 6/2007 |
| JP | 2008-279772 | 11/2008 |
| JP | 2009-018578 | 1/2009 |
| JP | 2009-222732 | 10/2009 |
| JP | 2010-080632 | 4/2010 |

* cited by examiner

*Primary Examiner* — Stella Yi
(74) *Attorney, Agent, or Firm* — Cozen O'Connor

(57) ABSTRACT

The aim is to regulate thickness on the optical axis in the production of wafer lenses. Disclosed is a wafer lens production method that is equipped with a dispensing process for dropping resin onto a molding die (64), an imprinting process for pressing either the molding die (64) or a glass substrate (2) toward the other, and a releasing process for releasing the glass substrate (2) from the molding die (64), and that repeats the processing from the dispensing process to the releasing process as a single cycle and successively forms resin lenses (4) on the glass substrate 2); wherein the height (A) of the non-lens area (6) surrounding the lenses (4) and the heights (B and C) of the glass substrate (2) are measured between the releasing process of a first cycle and the dispensing process of a second cycle, and the position of the molding die (64) is corrected for imprinting processes of the second cycle, on the basis of the heights (A-C).

23 Claims, 15 Drawing Sheets

FIG. 3
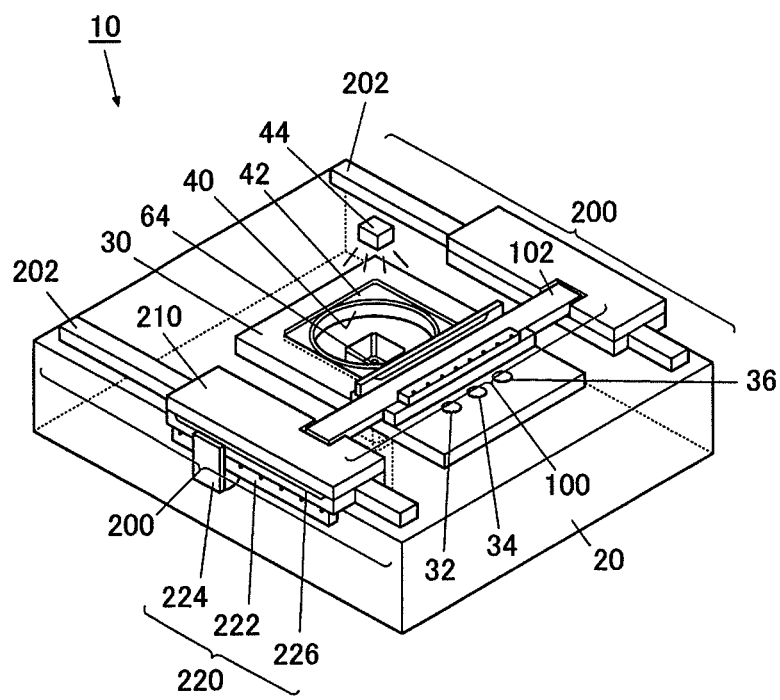
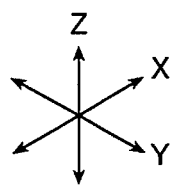

FIG. 15
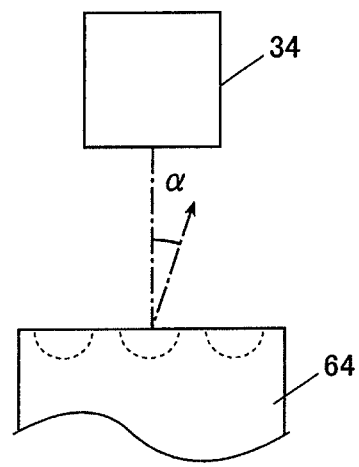
FIG. 16
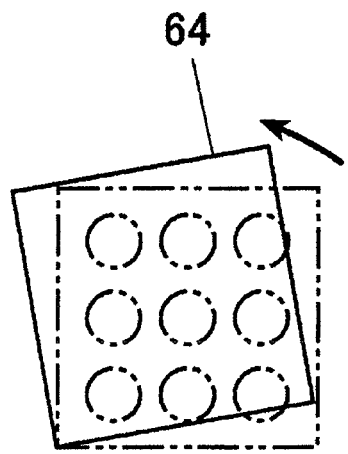
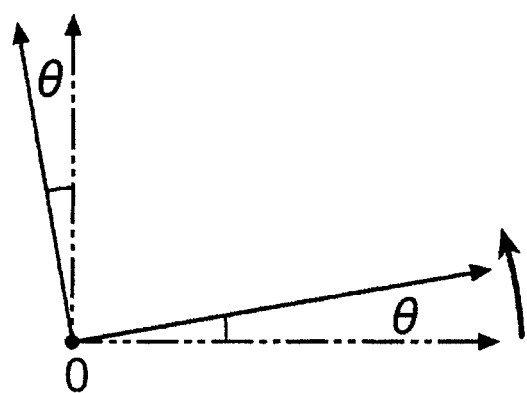

PRODUCTION METHOD OF WAFER LENS

RELATED APPLICATIONS

This application is a U.S. National Phase Application under 35 USC 371 of International Application PCT/JP2010/064157 filed Aug. 23, 2010.

This application claims the priority of Japanese application no. 2009-200168 filed Aug. 31, 2009, the entire content of which is hereby incorporated by reference.

TECHNICAL FIELD

The present invention relates to production methods of wafer lenses, and in particular, to technologies to control the thickness on the optical axis of wafer lenses to be constant.

BACKGROUND TECHNOLOGY

In recent years, in the production field of optical lenses, technologies to produce optical lenses, exhibiting high heat-resistance, have been studied, in which thermo-hardening lens portions are mounted on a glass substrate (See Patent Document 1). As an example of the production methods of the optical lenses which employs said technologies, a technology is put forward, in which after plural thermo-hardening molding resin products are formed as lens portions on the surface of the wafer-shaped glass substrate, which are so called "wafer lenses", the glass substrate is cut individually for each lens portion.

As an example of producing devices of the wafer lenses, a producing device is put forward, in which a molding die, arranged at a fixed position, and a stage, to support the glass substrate, are provided, whereby the stage can move on the X-Y surface against the molding die, so that the resin lens portions are formed on the glass substrate. In this producing device, the stage is moved to a predetermined position, so that the supported glass substrate is arranged to face the molding die, and at this arranged position, the molding die is pressed against the glass substrate to harden the resin, whereby the resin lens portions are formed on the glass substrate.

Concerning the wafer lens producing device described above, invented is a "step and repeat method", in that a sequence of actions is repeated, including that after the molding die is pressed against the glass substrate, and the glass substrate is released, the glass substrate is moved, so that plural resin lens portions are sequentially formed. Further, invented is a "collective method", in that a single molding die is pressed against a single glass substrate and released, so that plural resin lens portions are collectively formed (see Patent Document 2).

PRIOR ART DOCUMENT

Patent Document

Patent Document 1: JP 3926380
Patent Document 2: U.S. 2006/0259546A

SUMMARY OF THE INVENTION

Problems to be Solved by the Invention

However, in cases of both the "step and repeat method" and "collective method", after the molding operation of resin, the thickness on the optical axis of the wafer lenses tends to vary, so that the thickness on the optical axis must be controlled to be equal in both cases, which is a common problem (wherein the thickness represents the thickness of resin lens section, or represents the thickness of resin lens section adding the thickness of glass substrate).

Accordingly a main object of the present invention is to offer methods for producing the wafer lenses, in which each lens is formed to have an equal thickness on the optical axis.

Means for Solving the Problem

In order to solve the above problem, according to a producing method of wafer lenses, which is a first aspect of the present invention, including the steps of:

dispensing photo-curable resin into a molding die which is structured of a flat surface and a molding surface arranged on the flat surface;

imprinting so that one of the molding die and a glass substrate is pressed against the other;

exposing photo-curable resin to light rays after the step of imprinting; and releasing the glass substrate from the molding die;

wherein a single cycle, including processes from the step of dispensing to the step of releasing, is conducted at a first position of the glass substrate, after that, the molding die is moved relatively with respect to the glass substrate, the single cycle is performed again at a second position of the glass substrate, and the above cycle is repeated plural times so that resin lenses are sequentially molded on the glass substrate, wherein the producing method of wafer lenses further comprises the steps of:

between the step of releasing in the first cycle and the step of dispensing in the second cycle, measuring a distance between a non-lens position of a non-lens area surrounding the lenses and a first glass position of the glass surface, which is a surface of the glass substrate against which the resin is pressed by the molding die, and in the step of imprinting in the second cycle or later, correcting a pressing position of the molding die against the glass substrate, based on the distance measured by the step of measuring.

According to a producing method of wafer lenses, which is a second aspect of the present invention, including the steps of:

dispensing photo-curable resin into a molding die which is structured of a flat surface and a molding surface arranged on the flat surface;

imprinting so that one of the molding die and a glass substrate is pressed against the other;

exposing photo-curable resin to light rays after the step of imprinting; and releasing the glass substrate from the molding die;

wherein a single cycle, including processes from the step of dispensing to the step of releasing, is conducted at a first position of the glass substrate, after that, the molding die is moved relatively with respect to the glass substrate, the single cycle is performed again at a second position of the glass substrate, and the above cycle is repeated plural times so that resin lenses are sequentially molded on the glass substrate, wherein the producing method of wafer lenses further comprises the steps of:

between the step of releasing in the first cycle and the step of dispensing in the second cycle, detecting a position of a non-lens area surrounding the lenses and a second glass position which is an opposite surface the second glass against which the resin is pressed by the molding die, calculating a distance between the non-lens area and the second glass position, and in the step of dispensing in the second cycle or later, correcting a dropping amount of resin into the molding die, based on the distance calculated by the step of calculating.

According to a producing method of wafer lenses, which is a third aspect of the present invention, including the steps of:

dispensing photo-curable resin into a molding die which is structured of a flat surface and a molding surface arranged on the flat surface;

imprinting so that one of the molding die and a glass substrate is pressed against the other;

exposing photo-curable resin to light rays after the step of imprinting; and releasing the glass substrate from the molding die;

wherein a single cycle, including processes from the step of dispensing to the step of releasing, is conducted at a first position of the glass substrate, after that, the molding die is moved relatively with respect to the glass substrate, the single cycle is performed again at a second position of the glass substrate, and the above cycle is repeated plural times so that resin lenses are sequentially molded on the glass substrate, wherein the producing method of wafer lenses further comprises the steps of:

after the step of releasing on a preceding cycle of each cycle, measuring the distance between a non-lens area surrounding the lenses and a first glass position, which is the surface of the glass substrate against which the resin is pressed by the molding die, and on the step of imprinting in each cycle, correcting a pressing position of the molding die, based on the distance measured by the step of measuring.

According to a producing method of wafer lenses, which is a fourth aspect of the present invention, including the steps of:

dispensing photo-curable resin into a molding die which is structured of a flat surface and a molding surface arranged on the flat surface;

imprinting so that one of the molding die and a glass substrate is pressed against the other;

exposing photo-curable resin to light rays after the step of imprinting; and releasing the glass substrate from the molding die;

wherein a single cycle, including processes from the step of dispensing to the step of releasing, is conducted at a first position of the glass substrate, after that, the molding die is moved relatively with respect to the glass substrate, the single cycle is performed again at a second position of the glass substrate, and the above cycle is repeated plural times so that resin lenses are sequentially molded on the glass substrate, wherein the producing method of wafer lenses further comprises the steps of:

after the step of releasing on a preceding cycle of each cycle, and before the step of dispensing of a next cycle, detecting a position of a non-lens area surrounding the lenses, and a second glass position which is an opposite surface against which the resin is pressed by the molding die, and measuring the distance between said non-lens area and the second glass position, and on the step of dispensing of the next cycle, correcting a dropping amount of resin into the molding die, based on the distance calculated by the step of sensing.

According to a producing method of wafer lenses, which is a fifth aspect of the present invention, including the steps of:

dispensing photo-curable resin into a molding die which is structured of a flat surface and a molding surface arranged on the flat surface;

imprinting so that one of the molding die and a glass substrate is pressed against the other;

exposing photo-curable resin to light rays after the step of imprinting; and releasing the glass substrate from the molding die;

wherein a single cycle, including processes from the step of dispensing to the step of releasing, is conducted on a single glass substrate, after that, the glass substrate is changed to a new one to conduct the single cycle again, whereby the above single cycle is repeated plural times so that the resin lenses are formed sequentially on the plural glass substrates, wherein the producing method of wafer lenses further comprises the steps of:

between the step of releasing in the first cycle and the step of dispensing in the second cycle, measuring a distance between anon-lens position of a non-lens area surrounding the lenses and a first glass position of the glass surface which is a surface of the glass substrate against which the resin is pressed by the molding die, and in the step of imprinting in the second cycle or later, correcting a pressing position of the molding die against the glass substrate, based on the distance measured by the step of measuring.

According to a producing method of wafer lenses, which is a sixth aspect of the present invention, including the steps of:

dispensing photo-curable resin into a molding die which is structured of a flat surface and a molding surface arranged on the flat surface;

imprinting so that one of the molding die and a glass substrate is pressed against the other, exposing photo-curable resin to light rays after the step of imprinting; and releasing the glass substrate from the molding die;

wherein a single cycle, including processes from the step of dispensing to the step of releasing, is conducted on a single glass substrate, after that, the glass substrate is changed to a new one to conduct the single cycle again, whereby the above single cycle is repeated plural times so that the resin lenses are formed sequentially on the plural glass substrates, wherein the producing method of wafer lenses further comprises the steps of:

between the step of releasing in the first cycle and the step of dispensing in the second cycle, detecting a position of a non-lens area surrounding the lenses and a second glass position which is an opposite surface the second glass against which the resin is pressed by the molding die, and calculating a distance between the non-lens area and the second glass position, and in the step of dispensing in the second cycle or later, correcting a dropping amount of resin into the molding die, based on the distance calculated by the step of measuring.

According to a producing method of wafer lenses, which is a seventh aspect of the present invention, including the steps of:

dispensing photo-curable resin into a molding die which is structured of a flat surface and a molding surface arranged on the flat surface;

imprinting so that one of the molding die and a glass substrate is pressed against the other;

exposing photo-curable resin to light rays after the step of imprinting; and releasing the glass substrate from the molding die;

wherein a single cycle, including processes from the step of dispensing to the step of releasing, is conducted on a single glass substrate, after that, the glass substrate is changed to a new one to conduct the single cycle again, whereby the above single cycle is repeated plural times so that the resin lenses are formed sequentially on the plural glass substrates, wherein the producing method of wafer lenses further comprises the steps of:

after the step of releasing on a preceding cycle of each cycle, measuring the distance between a non-lens area surrounding the lenses and a first glass position, which is the surface of the glass substrate against which the resin is pressed by the molding die, and on the step of imprinting in each cycle, correcting a pressing position of the molding die, based on the distance measured by the step of measuring.

According to a producing method of wafer lenses, which is an eighth aspect of the present invention, including the steps of:

dispensing photo-curable resin into a molding die which is structured of a flat surface and a molding surface arranged on the flat surface;

imprinting so that one of the molding die and a glass substrate is pressed against the other;

exposing photo-curable resin to light rays after the step of imprinting; and releasing the glass substrate from the molding die;

wherein a single cycle, including processes from the step of dispensing to the step of releasing, is conducted on a single glass substrate, after that, the glass substrate is changed to a new one to conduct the single cycle again, whereby the above single cycle is repeated plural times so that the resin lenses are formed sequentially on the plural glass substrates, wherein the producing method of wafer lenses further comprises the steps of:

after the step of releasing on a preceding cycle of each cycle, and before the step of dispensing of a next cycle, detecting a position of a non-lens area surrounding the lenses and a second glass position which is an opposite surface against which the resin is pressed by the molding die, and measuring the distance between the non-lens area and the second glass position, and on the step of dispensing of the next cycle, correcting a dropping amount of resin into the molding die, based on the distance calculated by the step of sensing.

According to a producing method of wafer lenses, which is a ninth aspect of the present invention, including the steps of:

dispensing photo-curable resin into a molding die which is structured of a flat surface and a molding surface arranged on the flat surface;

imprinting so that one of the molding die and a glass substrate is pressed against the other, exposing photo-curable resin to light rays after the step of imprinting; and releasing the glass substrate from the molding die;

wherein a single cycle, including processes from the step of dispensing to the step of releasing, is conducted at a first position of the glass substrate, after that, the molding die is moved relatively with respect to the glass substrate, the single cycle is performed again at a second position of the glass substrate, and the above cycle is repeated plural times so that resin lenses are sequentially molded on the glass substrate, wherein the producing method of wafer lenses further comprises the steps of:

pre-sensing for measuring a first glass position of the glass surface, which is on the surface of the glass substrate against which the resin is pressed by the molding die, and the second glass position which is the surface of the glass substrate against which the resin pressed by the molding die, at plural positions of the glass substrate, before conducting a single cycle;

between the step of releasing in the first cycle and the step of dispensing in the second cycle, measuring a non-lens area surrounding the lenses, and calculating the distance between a position of the non-lens area and the first glass position measured in the step of pre-sensing, or the distance between the non-lens area and the second glass position measured in the step of pre-sensing;

in the step of imprinting in the second cycle or later, correcting a pressing position of the molding die, or correcting the dropping amount of resin into the molding die, in the step of imprinting, based on the distance measured in the step of calculating.

According to a producing method of wafer lenses, which is a tenth aspect of the present invention, including the steps of:

dispensing photo-curable resin into a molding die which is structured of a flat surface and a molding surface arranged on the flat surface;

imprinting so that one of the molding die and a glass substrate is pressed against the other;

exposing photo-curable resin to light rays after the step of imprinting; and releasing the glass substrate from the molding die;

wherein a single cycle, including processes from the step of dispensing to the step of releasing, is conducted on a single glass substrate, after that, the glass substrate is changed to a new one to conduct the single cycle again, whereby the above single cycle is repeated plural times so that the resin lenses are formed sequentially on the plural glass substrates, wherein the producing method of wafer lenses further comprises the steps of:

pre-sensing for measuring a first glass position of the glass surface, which is on the surface of the glass substrate, against which the resin is pressed by the molding die, and a second glass position which is on the surface of the glass substrate against which the resin pressed by the molding die, at plural positions of the glass substrate, before conducting a single cycle;

after the step of releasing in the preceding cycle of each cycle, and before the step of dispensing of a next cycle, measuring a non-lens position of a non-lens area surrounding the lenses, and calculating the distance between the non-lens area and the first glass position measured in the step of pre-sensing, or calculating the distance between the non-lens position and the second glass position, and in the step of imprinting in the second cycle or later, correcting a pressing position of the molding die, or correcting a dropping amount of resin into the molding die, in the step of imprinting, based on the distance measured in the step of calculating.

Effects of the Invention

According to the first, fifth, and sixth aspects, during the first cycle, calculated are the distance between the non-lens area and the surface of the glass substrate to press the resin, and the distance between the non-lens area and the opposite surface of the glass substrate to be pressed by the resin pressed by the molding die, and based on the calculated values, the pressing position of the molding die, and the dropping amount of resin, in the second or later cycles, are corrected, whereby the molding die can be supported to exhibit a predetermined clearance against the glass substrate, and the volume, including the resin lens and the glass substrate to face said resin lens, can be supported to be constant, which results in a constant thickness on the optical axis.

Further, according to the third, fourth, seventh, and eighth aspects, calculated in the preceding cycle are the distance between the non-lens area and the surface of the resin pressing surface of the glass substrate, or the distance between the non-lens area and the surface opposite to pressing surface of the glass substrate. Based on the above calculated results, corrected are the pressing position of the molding die and the dropping amount of resin, in the next cycle, whereby the molding die can be supported to exhibit a predetermined clearance against the glass substrate, and the volume, including the resin lens and the glass substrate to face said resin lens, can be supported to be constant, which results in a constant thickness on the optical axis.

Still further, according to the ninth and tenth aspects of the present invention, before starting the cycle, the position of the resin pressing surface and the position of the surface opposite to the pressing surface are measured at plural positions on the glass substrate, whereby using data concerning the position of the non-glass area on the first cycle or that of the first glass substrate, data concerning the position of the resin pressing surface, which was previously measured, and using data concerning the position opposite the resin pressing surface, the pressing position of the molding die of the second cycle or later, or of the second glass substrate, or the dropping amount of resin can be corrected, whereby the molding die can be supported to exhibit a predetermined clearance against the glass substrate, and the volume, including the resin lens and the glass substrate to face said resin lens, can be supported to be constant, which results in a constant thickness on the optical axis.

BRIEF DESCRIPTIONS OF THE DRAWINGS

FIG. 3 is a perspective view to show the outline structure of a producing device of the wafer lenses relating to a preferable embodiment of the present invention.

FIG. 15 is a view to explain the outline of a structure to adjust parallelism between a glass substrate and the molding die of the present embodiment.

FIG. 16 is a view to schematically explain the outline of a coordinate axes transformation on the two-dimensional plane of the molding die in the present embodiment.

EMBODIMENTS FOR CONDUCTING THE INVENTION

Figure 1:
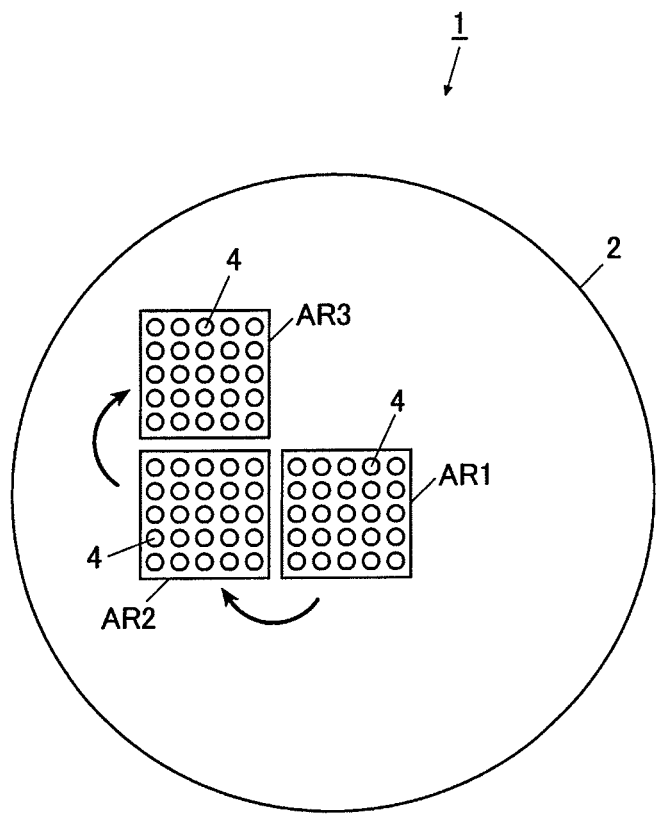
FIG. 1 is a plane view to show the outline structure of the wafer lenses.

Preferable embodiments of the present invention will now be detailed, while referring to the drawings.

[Embodiment 1]

Figure 2:
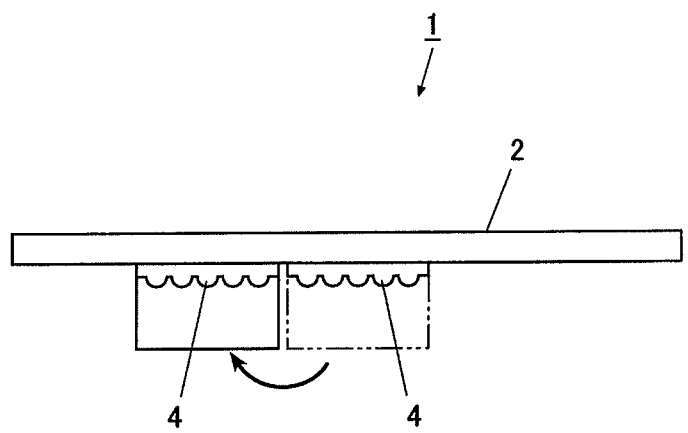
FIG. 2 is a side view to show the outline structure of the wafer lenses.

As shown in FIG. 1 and FIG. 2, formed wafer lens 1 includes circular glass substrate 2 and plural convex lens sections 4. Glass substrate 2 represents an example of the substrate.

On the surface of glass substrate 2, plural convex lens sections 4 are molded to be an array shape. A portion between each convex lens section 4 is non-lens section 6 (see FIG. 17 and FIG. 18). On convex lens section 4, very fine structures, such as diffraction grooves or uneven surfaces, are formed. On glass substrate 2, a concave lens section can be formed instead of convex lens section 4.

Since FIG. 1 and FIG. 2 show a mid-step of the production process, convex lens sections 4 have been formed at only a portion of the surface of glass substrate 2. In the present embodiment, convex lens sections 4 are sequentially formed by a single molding die unit on a single piece of glass substrate 2 (see arrows in FIG. 1 and FIG. 2), so that each glass substrate 2 is divided as a single portion for every convex section 4.

Convex lens section 4 is molded of photo curable resin. As said photo curable resin, acrylic resin and acryl ester resin are used. These resins can be cured via radical polymerization. Further, epoxy resin, to be cured via cation polymerization, can be used.

Light rays, which cure the photo curable resin used in the present invention, include visual light rays, ultra violet rays, and electron rays. Further, the light rays include not only the photo curable resin, but also light polymerization initiator and heat polymerization initiator, whereby the heat polymerization, in which heating is conducted, is used in combination. In case that photo curable resin, including only the light polymerization initiator as the polymerization initiator, is used, the light polymerization can be accelerated by heat, and if heat polymerization initiator is added, the acceleration effect is further increased.

Next, wafer lens producing device (10), to be used for producing wafer lens 1, will now be detailed.

Figure 4:
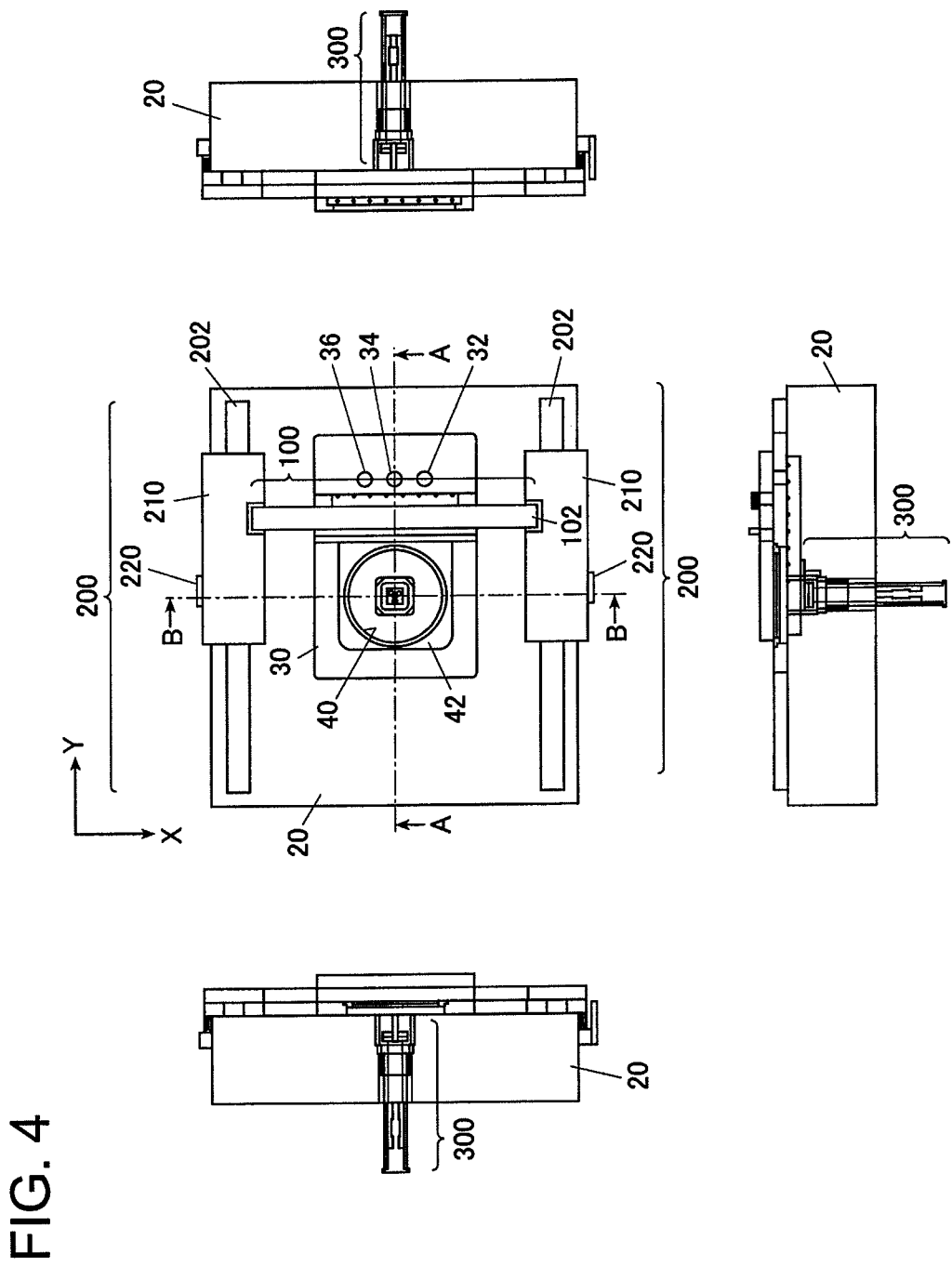
FIG. 4 is a plane view to show the producing device of the wafer lenses shown in FIG. 3.

As shown in FIG. 3 and FIG. 4, wafer lens producing device 10 is structured of bed 20, XY-stage 30 arranged on bed 20, X-axis moving mechanism 100 to move XY-stage 30 in the X-axis direction, and paired Y-axis moving mechanisms 200 to move XY-stage 30 in the Y-axis direction.

Figure 5:
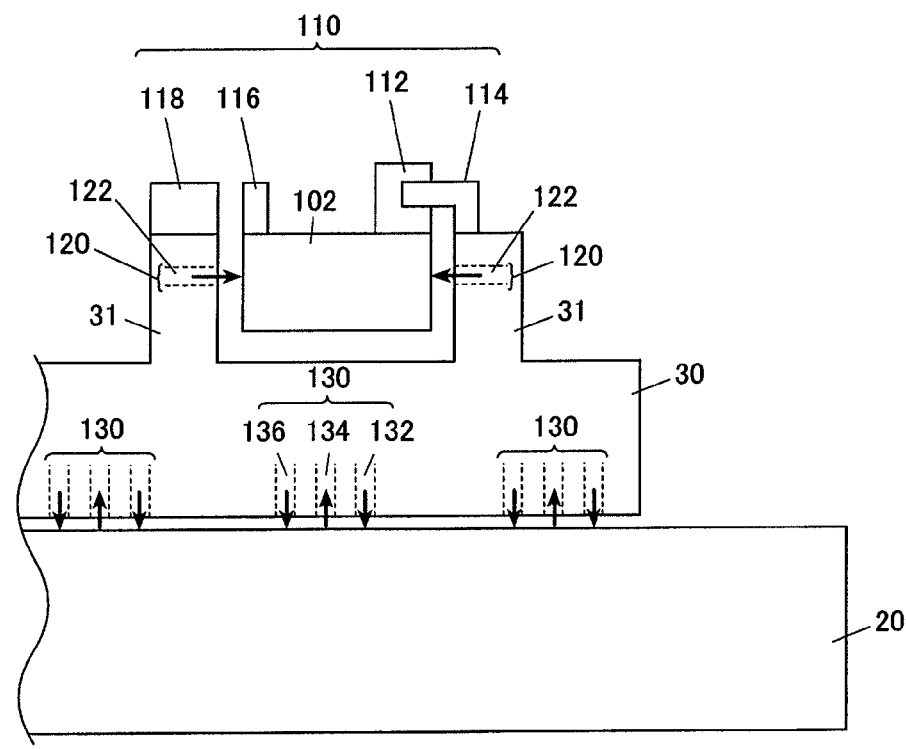
FIG. 5 is a view to show the outline structure of an X-axis moving mechanism which is used for the preferable embodiment of the present invention, being a cross-sectional view along line A-A in FIG. 4.

As shown in FIG. 4 and FIG. 5, X-axis moving mechanism 100 has X-axis guide 102, which is arranged along the X-axis direction. As shown in FIG. 5, XY-stage 30 is arranged below X-axis guide 102. Paired projected sections 31, which are arranged in the X-axis direction, are formed on XY-stage 30, and X-axis guide 102 is arranged between projected sections 31.

As shown in FIG. 5, X-axis moving mechanism 100 includes linear motor 110 which actually moves XY-stage 30 in the X-direction. Linear motor 110 includes a well-known mechanism which is structured of stator 112, rotor 114, scale 116, and sensor 118.

Stator 112 is mounted on X-axis guide 102. Rotor 114, mounted on one of projected sections 31 on XY-stage 30, is movable along X-axis guide 102. Scale 116 is mounted on X-axis guide 102. Sensor 118 is mounted on another projected section 31 on XY-stage 30.

X-axis moving mechanism is configured to work in such a way that while sensor 118 detects scale 116, rotor 114 moves along stator 112, so that XY-stage 30 can move a predetermined distance in the X-axis direction along X-axis guide 102.

Air slide guide mechanism 120 is arranged on each projected section 31 of XY-stage 30. Air slide guide mechanism 120 has ejection hole 122 to eject air. Air slide guide mechanism 120, after being activated, ejects air from each ejection hole 122 to X-axis guide 102, so that XY-stage 30 levitates above X-axis guide 102.

A plurality of air slide guide mechanisms 130 are mounted at a lower portion of XY-stage 30. Each air slide guide mechanism 130 has two ejection holes 132 and 136 to eject air, and one suction hole 134 to vacuum air. Air slide guide mechanism 130, after being activated, ejects air from ejection holes 132 and 136 onto bed 20, while vacuums air from suction hole 134, so that XY-stage levitates at a predetermined height above bed 20.

Since XY-stage 30 levitates above X-axis guide 102 and bed 30 by air slide guide mechanisms 120 and 130, X-axis moving mechanism 100 can smoothly move XY-stage 30.

As shown in FIG. 3 and FIG. 4, Y-axis moving mechanisms 200 has paired Y-axis guides 202, mounted in the Y-axis direction. Paired Y-axis moving bodies 210 are provided on Y-axis guide 202.

Both ends of X-axis guide 102 are fixed on each Y-axis moving body 210. Y-axis moving body 210 is configured to move along Y-axis guide 202 in the Y-axis direction, under the condition that Y-axis moving body 210 supports X-axis guide 102, and XY-stage 30, which is supported by X-axis guide 102.

In more detail, Y-axis moving mechanism 200 includes linear motor 220. In the same way as linear motor 110 of X-axis moving mechanism 100, linear motor 220 is structured of stator 222, rotor 224, scale 226, and a sensor (the sensor is not shown in a figure). While the sensor detects scale 226, rotor 224 moves along stator 222, so that Y-axis moving body 210 can move a predetermined distance in the Y-axis direction, along Y-axis guide 202.

Figure 6:
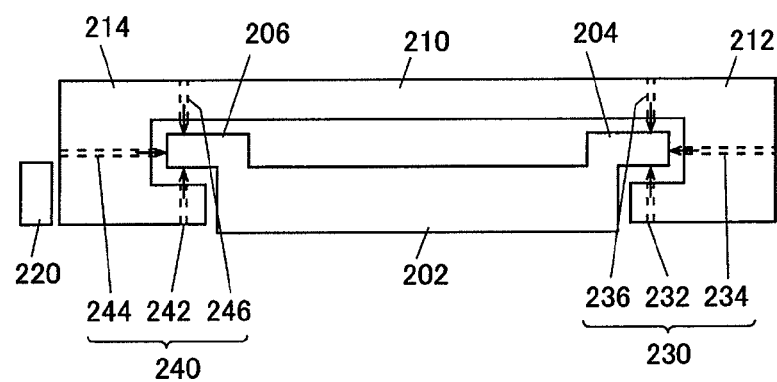
FIG. 6 is a view to show the outline structure of a Y-axis moving mechanism which is used for the preferable embodiment of the present invention, being a cross-sectional view along line B-B in FIG. 4.

As shown in FIG. 6, hooking sections 212 and 214, which are formed of hooks, are formed on both ends of Y-axis-moving body 210. End portions 204 and 206 of Y-axis guide 202 are arranged with a clearance, to engage inner portions of hook sections 212 and 214, respectively.

Air slide guide mechanism 230 is arranged in hooking section 212, while air slide guide mechanism 240 is arranged within hooking section 214. Air slide guide 230 has ejection holes 232, 234, and 236, to eject air in three directions (in the upward, sideward, and downward directions). Air slide guide 240 also has ejection holes 242, 244, and 246, to eject air in three directions (in the upward, sideward, and downward directions).

Air slide guide 230 is activated to eject air from ejection holes 232, 234, and 236 onto end portion 204 of Y-axis guide 202, while air slide guide 240 is activated to eject air from ejection holes 242, 294, and 246 onto and portion 206 of Y-axis guide 202, whereby Y-axis moving body 210 can float above Y-axis guide 202.

As shown in FIG. 3 and FIG. 4, on XY-stage 30, installed are dispenser 32 to drip resin onto glass substrate 2, laser length measuring machine 34 to measure the flatness (inclination), the height, and the position of molding die 64, and a microscope 36 to be used for an alignment operation of glass substrate 2 against molding die 64.

As shown in FIG. 3, through-hole 40, whose shape is circular in the top view, is formed from the front surface through the rear surface, wherein glass substrate 2 is supported over through-hole 40.

In detail, since a step is formed on through-hole 40, glass substrate 2 is fixed on the step, by a spring which is not illustrated. In order to cover through-hole 40, cover section 42, whose shape is a quadrilateral s the top view, is mounted on XY-stage 30. Cover section 42 is structured of an optical transparent member, such as a quartz plate, while light source 44 is mounted above cover section 42.

Figure 7:
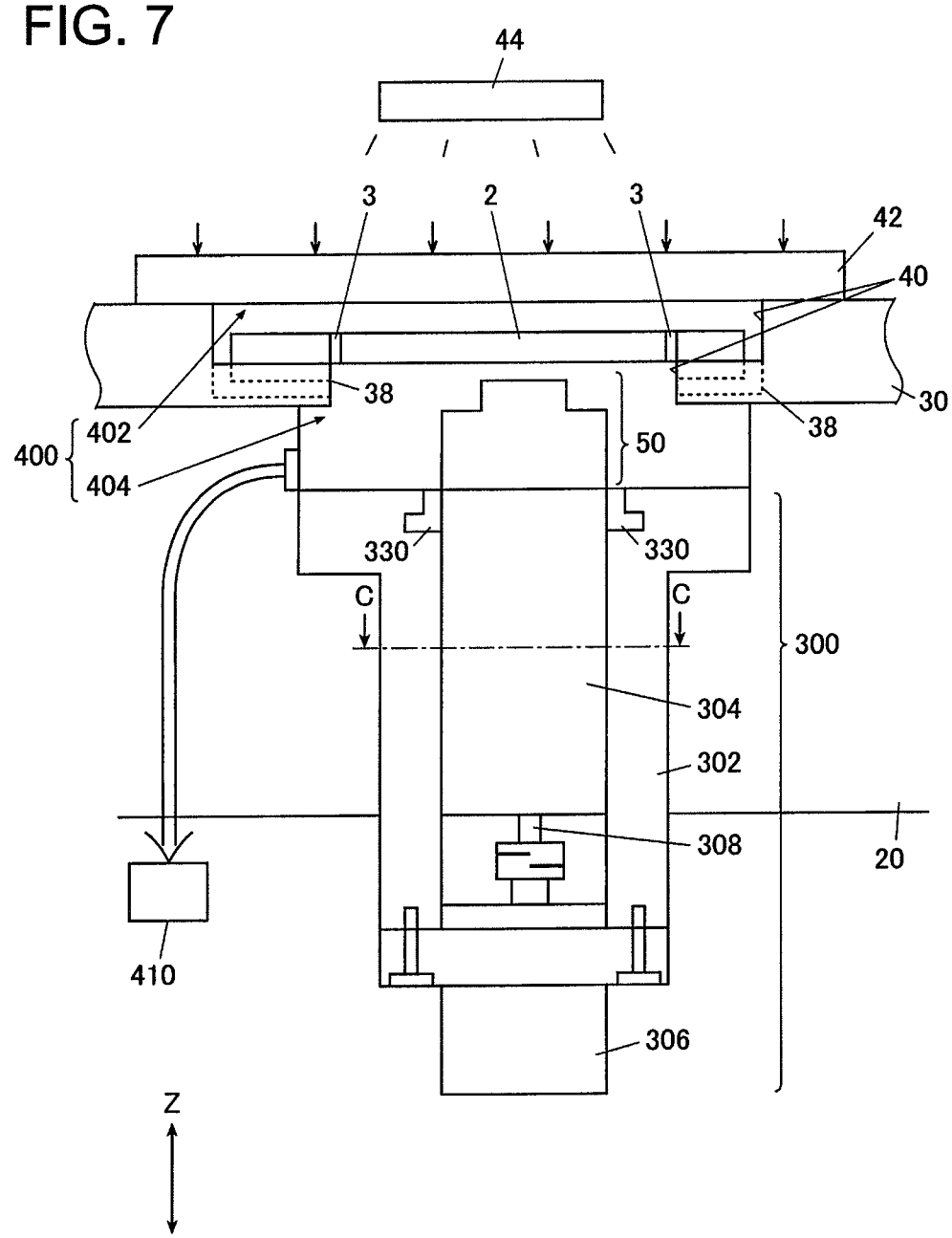
FIG. 7 is a cross-sectional view to schematically show an XY stage and internal portions of a base plate which is used for the preferable embodiment of the present invention.

As shown in FIG. 7, molding die section 50 to form convex lens section 4 of wafer lens 1, and Z-axis moving mechanism 300 to vertically move molding die section 50 in the Z-axis direction, are installed within bed 20. Molding die section 50 is installed on the top portion of Z-axis moving mechanism 300 (Z-stage 304).

Z-axis moving mechanism 300 includes Z-axis guide 302, which is a square tube having a flange on the top portion, Z-stage 304 to move in the Z-axis direction within Z-axis guide 302, and motor 306 to move Z-stage 304 in the Z-axis direction (being the vertical direction).

Motor 306 carries a potentiometer, and shaft 308 is connected to motor 306. Concerning Z-axis moving mechanism 300, shaft 308 is configured to vertically elongate and contract by motor 306, and due to this motion, Z-stage 304 and molding die section 50 are moved vertically.

Figure 8A:
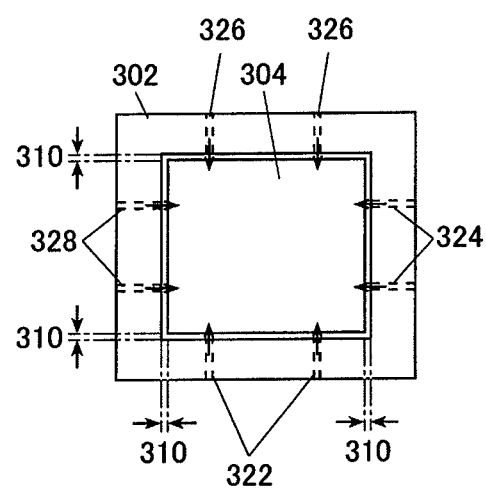
FIG. 8 is a cross-sectional view along line C-C in FIG. 7.

As shown in FIG. 8(a), clearance 310 is provided between an inner peripheral surface of Z-axis guide 302 and a side surface of Z-stage 304.

Air slide guide mechanism 320 is mounted on Z-axis guide 302. Air slide guide mechanism 320 has ejection holes 322, 324, 326 and 328 to eject air. Air slide guide mechanism 320, being activated, ejects air from ejection holes 322, 324, 326 and 328 onto Z-stage 304, to levitate Z-stage 304.

In addition, as shown in FIG. 7, the inner peripheral surface, to form a flange of Z-axis guide 302, is sealed with sealing member 330, such as silicon grease, an oil seal, and an O-ring, whereby the clearance between Z-axis guide 302 and Z-stage 304 becomes air-tight, so that air within clearance 310 cannot leak outward.

Further, in order to obtain the above effect, more preferable is to prepare a flange section around Z-stage 304, while metal bellows are used to cover between Z-axis guide 302, which is arranged to be fixed, and the flange section of Z-axis guide 302, all of which are not illustrated.

As shown in FIG. 7, empty space section 400 is formed on an area surrounded by cover section 42, XY-stage 30, bed 20, and Z-axis guide 302. Empty space section 400 is compartmented by glass substrate 2, installed on XY-stage 30, into upper empty space section 402, formed between glass substrate 2 and cover section 42, and lower empty space section 404, formed between glass substrate 2 and Z-axis moving mechanism 300.

Continuous hole 3, which communicates upper empty space section 402 with lower empty space section 404, is formed on a peripheral border of glass substrate 2, so that no pressure difference can form between lower empty space section 404 and lower empty space section 404. Since lower empty space section 404 is connected to decompression mechanism 410, such as a vacuum pump, empty space section 400 becomes a reduced-pressure condition, due to the operation of decompression mechanism 410.

In addition, instead of continuous hole 3, formed on glass substrate 2, continuous hole 38 can be formed in XY-stage 30, which is shown by the dotted lines in FIG. 7.

Decompression mechanism 410 has been structured to communicate lower empty space section 404, however, communicate decompression mechanism 410 can communicate lower empty space section 404.

Figure 9:
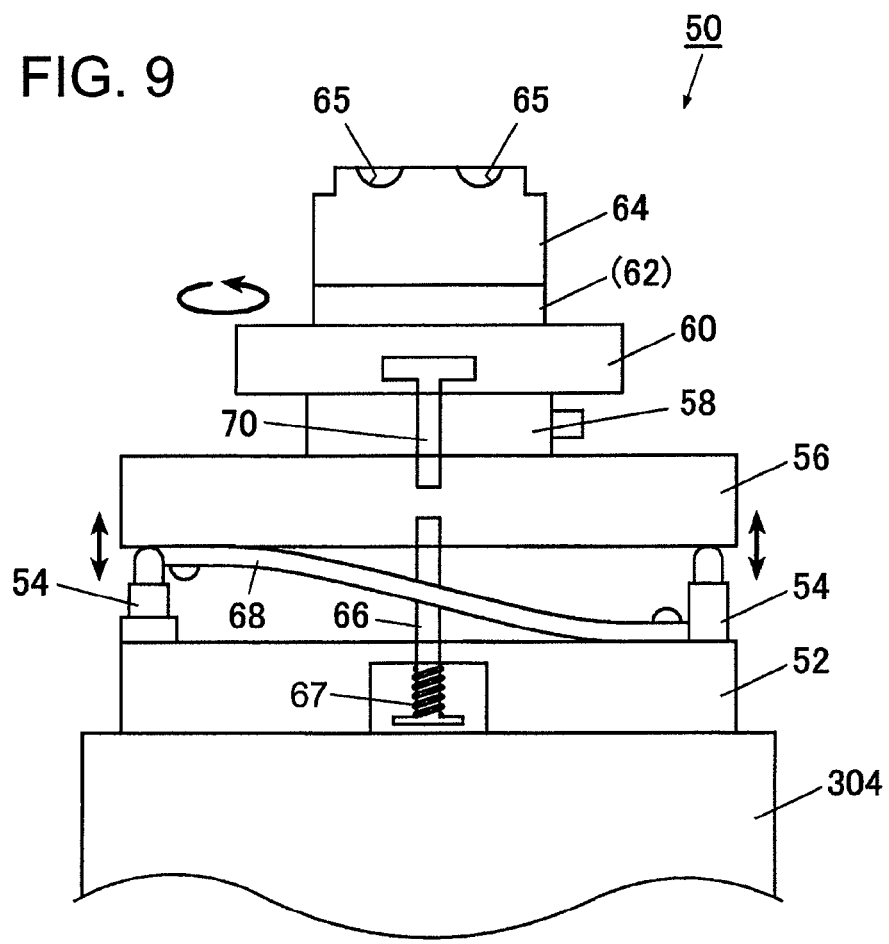
FIG. 9 is a cross-sectional view to show the outline structure of a molding die section, used for the preferable embodiment of the present invention.

As shown in FIG. 9, molding die section 50 includes first supporting plate 52, piezo actuator 54, second supporting plate 56, pressure sensor 58, third supporting plate 60, and molding die 64, which are provided on Z-stage 304 in the above order.

First supporting plate 52 and second supporting plate 56 are connected to each other by pre-compressing screw 66, and both plates are urged to be nearer to each other by spring 67. Three piezo actuators 54 and L-shaped plate spring 68 are installed between first supporting plate 52 and second supporting plate 56 (see FIG. 10). Second supporting plate 56 and third supporting plate 60 are connected to each other by screw 70, and pressure sensor 58 is installed between second supporting plate 56 and third supporting plate 60.

Figure 10:
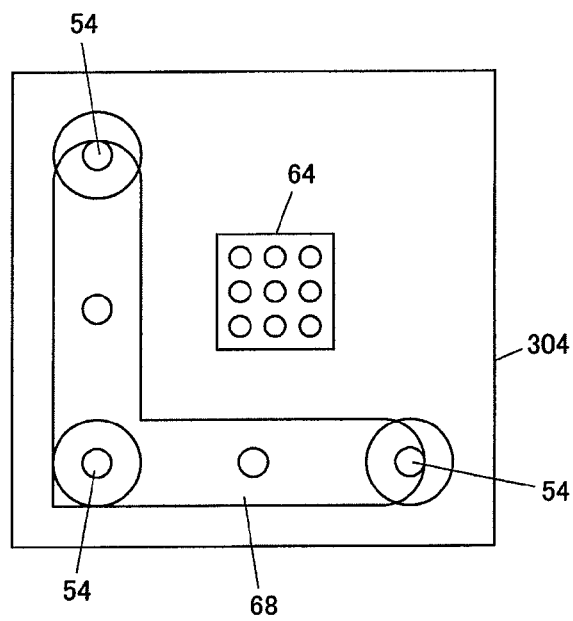
FIG. 10 is a plane view to show the outline structure of FIG. 9.

As shown in FIG. 10, piezo actuators 54 are mounted at three portions of first supporting plate 52, to support second supporting plate 56 at three points. On molding die section 50, operation of each piezo actuator 54 is controlled based on output values of pressure sensor 58, whereby inclinations are adjusted for second supporting plate 56, third supporting plate 60 and molding die 64. As a result, molding die 64 and glass substrate 2 are held parallel to each other, and after resin has been applied into molding die 64, pressure against the resin is controlled to be a desired value, whereby mold clamping and transcription forming are preferably conducted.

The present embodiment is structured of three piezo actuators 54. However, if the above-described paralleling movement can be conducted as desired, and if positions of the piezo actuators are desirable for weight control, the number is not limited to three.

A plurality of cavities 65 (being concave sections) are formed in the shape of an array in molding die 64. The surface (being a molding surface) of cavity 65 is a negative shape to correspond to convex lens section 4 of wafer lens 1. That is, as detailed later, when wafer lenses 1 are molded by molding die 64, a portion of cavity 65 becomes convex lens section 4, while a portion of flat surface between cavities 65 becomes non-lens section 6. Molding die 64 can be formed of metal or resin.

Since optical sensor 72, being a non-contact sensor, is mounted on molding die 64, the height of members (being glass substrate 2), facing molding die 64, can be measured.

In this case, optical sensor 72 is used, however, various measuring means can be used, if they are well known means to measure the height. A non-contact sensor, which does not affect adversely the optical characteristics of wafer lens 1, is preferable to use.

Figure 11:
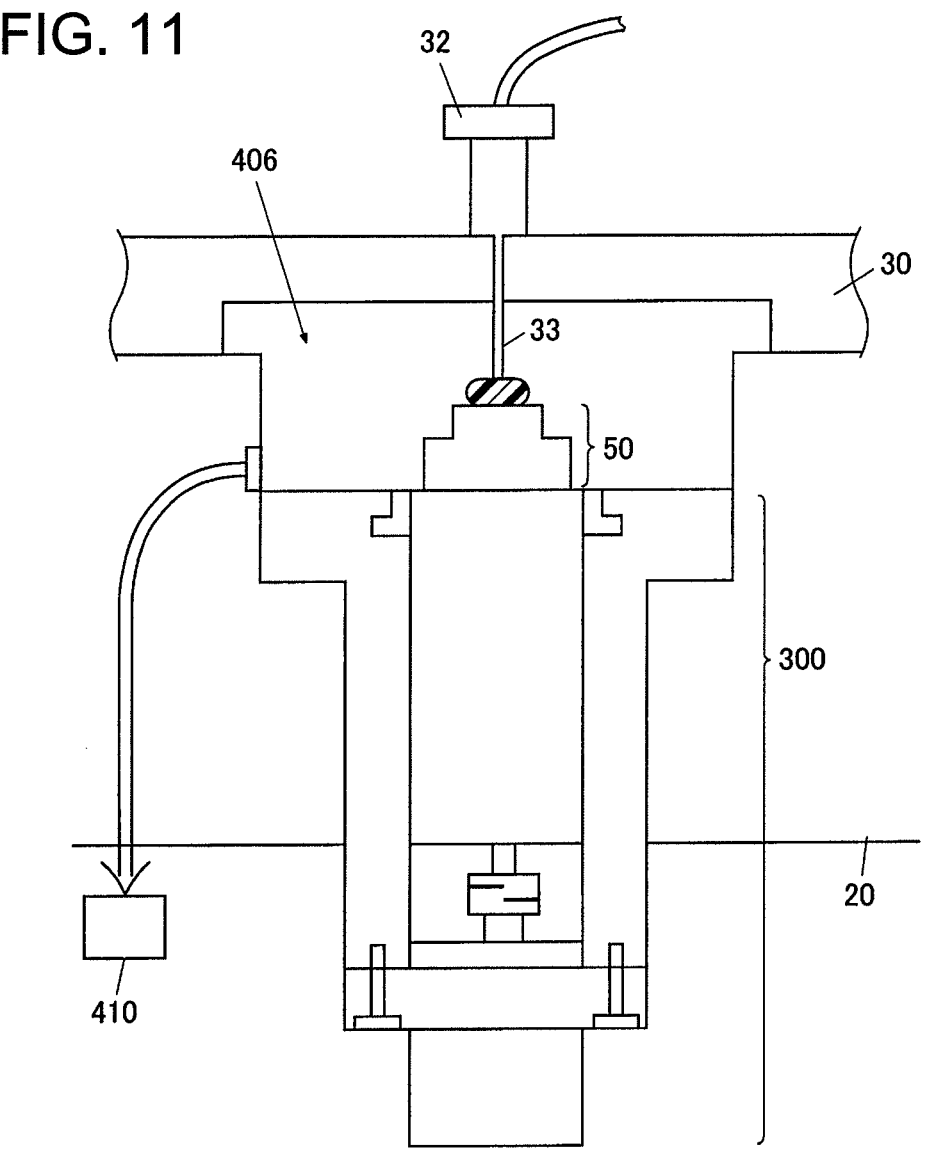
FIG. 11 is a cross-sectional view to show the outline structure of the molding die section on which a dispenser is arranged to face the molding die, in the preferable embodiment of the present invention.
Figure 12:
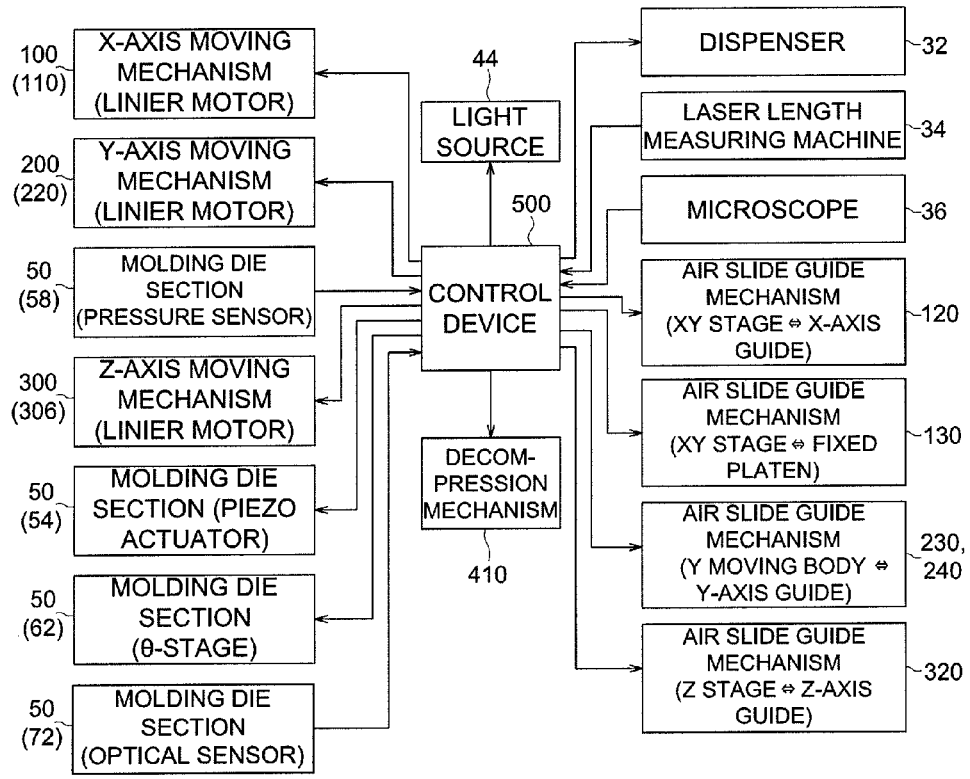
FIG. 12 is a block diagram to show the outline control structure, used for the preferable embodiment of the present invention.

As shown in FIG. 11, dispenser 32 has a needle section through which the resin drips, and said needle section 33 passes through XY-stage 30. In a condition that dispenser 32 and molding die section 50 are placed to face each other, empty space section 406 is formed in an area which is surrounded by XY-stage 30, bed 20, and Z-axis moving mechanism 300. In addition, the top of needle section 33 of dispenser 32 is arranged into empty space section 406. In this condition, due to the operation of decompression mechanism 410, empty space section 406 is in a reduced-pressure condition.

Various sections shown in FIG. 11 are the same as those shown in FIG. 7, so that the same reference numerals are given to the same sections, and their explanations are abbreviated.

Wafer lens producing device 10, having the above structures, includes control device 500. Connected to control device 500, are dispenser 32, laser length measuring machine 34, microscope 36, light source 44, molding die section 50 (such as piezo actuator 54, pressure sensor 58, and θ-stage 62), X-axis moving mechanism 100, Y-axis moving mechanism 200, Z-axis moving mechanism 300, air slide guide mechanisms 120, 130, 230, 240, and 320, and decompression mechanism 410. Control device 500 is configured to receive detected results from these members, and to control their operations (starting, stopping, or the like).

Figure 13:
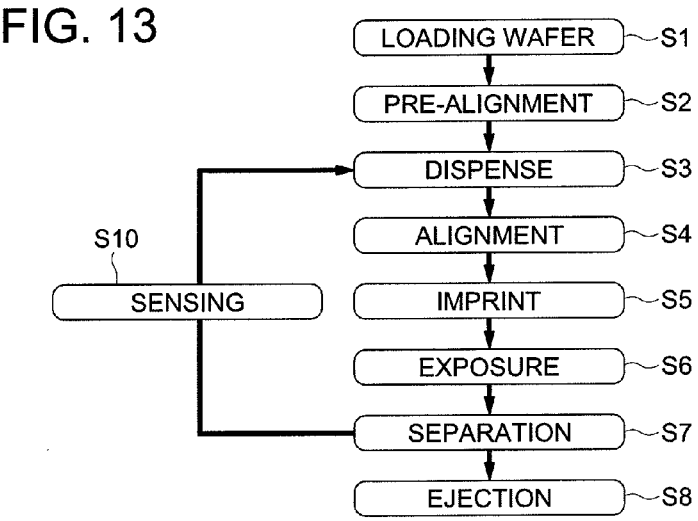
FIG. 13 is a flow chart to explain the outline of a producing method of the wafer lenses, relating to a preferable embodiment of the present invention.

Next, a producing method of wafer lens 1, using above-detailed wafer lens producing device 10, will be explained, while referring to FIG. 13 and FIG. 14.

Firstly, glass substrate 2 is installed on XY-stage 30 (which is wafer loading step S1), and through-hole 40 of XY-stage 30 is covered with cover section 42 (see FIG. 7).

After that, X-axis moving mechanism 100 (being linear motor 110), Y-axis moving mechanism 200 (being linear motor 220), air slide guide mechanisms 120, 130, 230, and 240 are activated so that XY-stage 30 is floated by air and moved in the X-axis direction and Y-axis direction, whereby dispenser 32 is positioned to be aligned just above molding die 64 (which is pre-alignment step S2).

In this case, an alignment mark is preliminarily applied on a predetermined position on bed 20. In the pre-alignment process, said alignment mark is observed through microscope 36, so that the position of dispenser 32 is aligned.

After the position of dispenser 32 has been aligned, air slide guide mechanisms 120, 130, 230 and 240 are deactivated, so that XY-stage 30 and bed 20 come into close contact with each other, and are locked to each other. Due to this, XY-stage 30 is fixed at its position. Under this condition, predetermined amounts of resin are dripped onto molding die 64 of molding die section 50, from needle section 33 of dispenser 32 (which is dispensing step S3, see FIG. 11).

Figure 14:
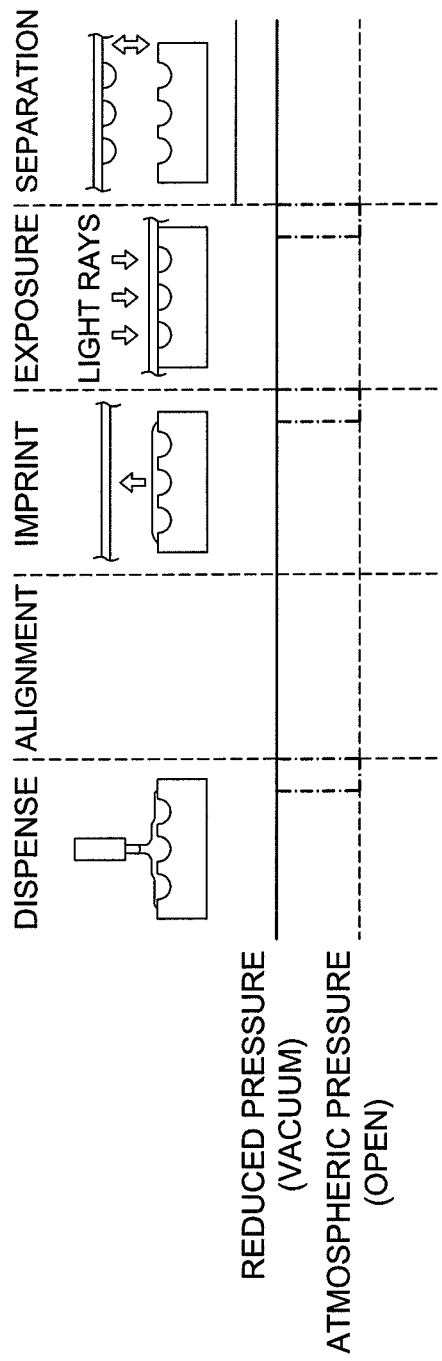
FIG. 14 is the outline of the timing chart to show a pressure condition during processes which are from a dispensing process to a releasing process.

At this time, as shown in solid lined portions in FIG. 14, decompression mechanism 410 is controlled so that empty space section 406 is depressurized. "Depressurized" means that empty space section 406 is depressurized to a vacuum state, in more detail, the pressure is decreased so that air bubbles are not generated from the inside of the resin, but air bubbles, entered the resin from the atmosphere, can be deleted. For example, when epoxy resin is applied to drop from dispenser 32, if empty space section 406 is vacuumed greater than 2,000 Pa, and less than $10^{-2}$ Mpa, no air bubbles are generated from the inside of said resin.

When dispensing step S3 is processed under the depressurized condition, air bubbles are prevented from entering the resin.

In addition, in the present embodiment, the operations, from dispensing step S3 to separating step S7, are conducted under a vacuum condition, and the definition of "to be depressurized" is based on the above description.

After that, air slide guide mechanisms 120, 130, 230, and 240 are activated so that XY-stage 30 is floated on air, and moved in the X-axis direction and Y-axis direction, whereby previously installed glass substrate 2 is aligned closely above molding die 64 of molding die section 50 (which is alignment step S4, see FIG. 7).

After that, as shown in FIG. 15, well-known laser length measuring machine 34 is positioned immediately above molding die 64. Subsequently, air slide guide mechanisms 120, 130, 230 and 240 are deactivated, so that XY-stage 30 and bed 20 come into contact with each other, to be locked condition with each other.

Figure 8B:
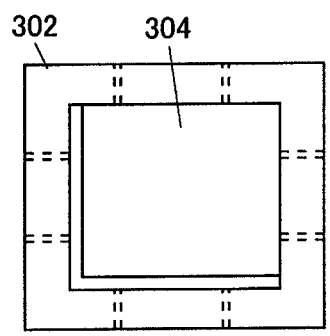

At the same time, motor 306, and air slide guide mechanism 320 are controlled to eject air from ejection holes 322, 324, 326 and 328, so that Z-stage 304 is positioned at a predetermined height. Subsequently, as shown in FIG. 8(*b*), for example, ejection holes 322 and 328 are controlled to eject air so that a portion of Z-stage 304 comes into contact with the inner surface of Z-axis guide 302. Due to this action, the position of molding die section 50 is supported constantly in a locked condition, by the frictional force between Z-stage 304 and Z-axis guide 302.

Subsequently, by laser length measuring machine 34, the height of more than three points is measured. From the measured results, based on the inclination of the top surface of molding die 64, and the outputted value of the measured heights of molding die 64 (which is variance value of angle α, see FIG. 15), piezo actuator 54 is controlled, so that the lower surface of glass substrate 2 and the upper surface of molding die 64 are positioned to be parallel with each other.

Subsequently, the locked condition is released, and microscope 36 is arranged just above molding die 64. Air slide guide mechanisms 120, 130, 230 and 240 are deactivated, so that XY-stage 30 and bed 20 come into close contact with each other, and are locked to each other.

At the same time, as shown in FIG. 8(*b*), air slide guide mechanism 320 is controlled to eject air from ejection holes 322 and 328, so that a portion of Z-stage 304 is controlled to come into contact with the inner surface of Z-axis guide 302. Due to this, the position of molding die section 50 is locked (that is, the position is established). In other words, molding die section 50 is supported at a fixed position by the frictional force between Z-stage 304 and Z-axis guide 302.

Accordingly, due to the contact of Z axis guide 302 with Z-stage 304, since molding die 64 is mounted on Z-stage 304, molding die 64 can always be supported at a constant position and at a constant angle, against Z-axis guide 302. At a result, under the condition that locking between them is released, Z-stage 304 and molding die 64 can be moved smoothly, while under the locked condition, the forming operation can be conducted at the same attitude as that of the adjustment operation, which is an advantage.

Subsequently, molding die 64 is detected by microscope 36, whereby a real arranged position of molding die 64 is obtained, based on the detected results. The axial coordinates of an initial position of molding die 64, which have been previously set in control device 500, are transferred to agree with the real arranged position.

In more detail, from the top of molding die 64, at least two points on molding die 64 are viewed and recognized by microscope 36, whereby one point is determined to be an origin, while the other point is determined to be a correcting point. For example, alignment marks are preliminarily plotted at the diagonal positions on molding die 64. One alignment mark is determined to be origin "O", while the other alignment mark is determined to be a correcting point.

In the present embodiment, microscope 36 is used as an example of the position detecting devices, to detect the arranged position of molding die 64.

Subsequently, a straight line, to be used for the coordinate transformation, is calculated, wherein said straight line joins origin "O" and the correcting point. Subsequently, a variance is calculated, which is between said calculated straight line and a previously determined axis coordinate, so that the axis coordinate is transferred, based on said variance (which is a variance of angle θ, see FIG. 16). That is, on control device 500, the arrangement position of molding die 64 on the plane surface is previously determined as the axis coordinate. Then, the variance is obtained, which is between said previously determined axis coordinate and the straight line to be used for the coordinate transformation, viewed by microscope 36 and calculated. Then, as shown in FIG. 16, the previously determined axis coordinate (see two-dashed lines) is transferred to the axis coordinate (see solid lines), calculated by said variance. Due to this transformation, the relative two-dimensional relative positional relationship can be fixed, which is between molding die 64 and glass substrate 2, whereby the movement of glass substrate 2 against molding die 64 can be precisely conducted.

In addition, it is also possible to conduct the rotating movement of molding die 64 in such a way that instead of the transformation of the above axis coordinate, to be conducted by control device 500, θ-stage 62 is set to rotate molding die 64 on molding die section 50 (see FIG. 9), whereby θ-stage 62 is controlled to correspond molding die 64 to the coordinate axes, on which molding die 64 is previously determined (that is, the varied axis coordinate is turned back to the original condition).

In this condition, the position of molding die section 50 is controlled, so that molding die 64 is elevated to a predetermined position against glass substrate 2, whereby molding die 64 is supported at said predetermined position (which is imprinting step S5).

In more detail, Z-axis moving mechanism (being motor 306) is activated to elongate shaft 308 upward, so that Z-stage 304 is lifted upward.

In this case, based on an output value from a potentiometer, which is built in motor 306, the operation of motor 306 is controlled, so that Z-stage 304 is moved to a predetermined height. As a result, the resin is pressed by glass substrate 2, and is gradually spread out, so that the resin fills cavity 65 of molding die 64.

Also in imprinting step S5, decompression mechanism 410 is controlled to reduce the pressure in empty space section 400.

Under a reduced pressure condition, the resin is pressed against glass substrate 2, whereby air bubbles can be prevented from entering the resin. Further, since empty space section 400 is controlled to be in the reduced pressure condition, no pressure difference is generated between upper empty space section 402 and lower empty space section 404, whereby glass substrate 2 can be prevented from curling or deforming.

After that, while Z-stage 304 is supported at the set position, light source 44 is controlled to radiate light to cure the resin (which is light exposing step S6).

In this condition, since decompression mechanism 410 is controlled to reduce the pressure in empty space section 400, oxygen inhibition against the resin is prevented, so that the resin can be certainly cured. Further, in light exposing step S6, since the light rays emitted from light source 44 may enter elements of optical sensor 72, it is preferable that a light shielding member is mounted on optical sensor 72, so that the elements can be protected temporarily against the light rays.

However, when the resin is going to be cured (when the resin is being cured, or after the resin has been cured), in case that Z-stage 304 is still supported at the predetermined height, even though the resin is cured and constricted, glass substrate 2 cannot follow the constriction of the resin, whereby distortion is generated within the resin, or the transcription of the surface shape of cavity 65 may be insufficiently conducted onto the resin.

To overcome these situations, light source 44 is activated for a predetermined time interval, and after a certain amount of light has been radiated onto the resin, molding die section 50 is controlled to keep the pressing force of molding die 64 against glass substrate 2 at a predetermined measure. In more detail, based on the outputted value of pressure sensor 58, piezo actuator 54 is activated to move molding die 64 upward.

After that, light source 44 is deactivated, so that the light radiation onto the resin is stopped. After the stop of light radiation, motor 306 is activated to shrink shaft 308 downward, whereby Z-stage 304 is moved downward. Due to these operations, the cured resin and glass substrate 2 are separated from molding die 64 (which is separating step S7).

At this time, decompression mechanism 410 is controlled to make empty space section 400 to be under a decompressed condition preventing from the atmospheric pressure, whereby the separation from the molding die is easily conducted. Consequently, plural convex lens sections 4, depending on the number of cavities 65 on molding die 64, are formed on glass substrate 2.

After that, a process, being a single cycle, which is from dispensing step S3 to separation step S7, is repeated plural times, whereby plural convex lens sections 4 are formed sequentially on glass substrate 2 (see FIG. 1 and FIG. 2).

In this case, when convex lens sections 4 are formed on glass substrate 2, a fine gap (namely clearance) is made between the flat surface of molding die 64 and glass substrate 2, whereby non-lens section 6 (see FIG. 17) is formed around each lens section 4.

In the present embodiment, after the first cycle is conducted to separate glass substrate 2 from molding die 64, XY-stage 30 is moved very fine by operated X-axis moving mechanism 100 (being linear motor 110), Y-axis moving mechanism 200 (being liner motor 220), and air slide guide mechanisms 120, 130, 230, and 240. As shown in FIG. 16, the height of glass substrate 2 so that the height of non-lens section 6 are measured by optical sensor 72 (which is sensing step S10). In the first embodiment, this sensing step S10 is only conducted in the first cycle.

Figure 17A:
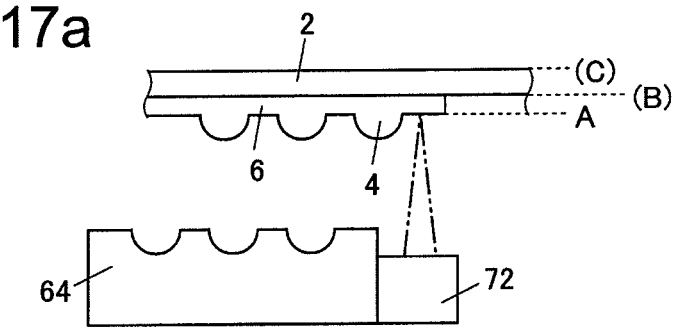
FIG. 17 is a view to explain the outline of the measurement of the height of a resin section and the glass substrate in the present invention.
Figure 17B:
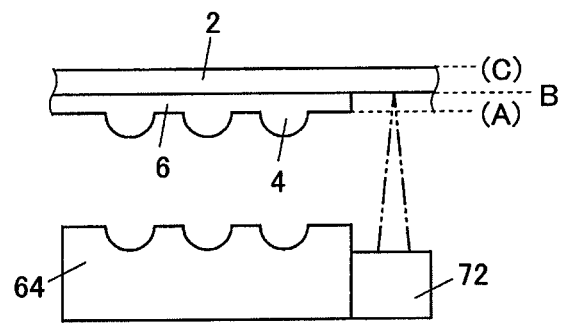
Figure 17C:
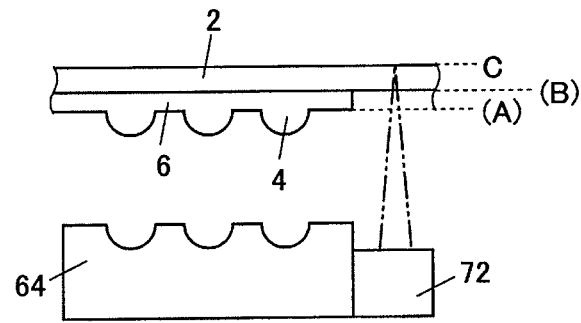

In detail, non-lens section 6 is set to face optical sensor 72, and as shown in FIG. 17 (a) the height of the lower surface of non-lens section 6 is measured. Glass substrate 2 is also set onto face optical sensor 72 as shown in Figs. 17(b) and 17(c), so that the height of lower surface and the height of the upper surface of glass substrate 2 are measured.

In the explanation below, "point A" represents the height of the lower surface of non-lens section 6. "Point B" represents the height of the lower surface of glass substrate 2, which is a first glass position, being a surface of molding die 64 to press the resin. "Point C" represents the height of the upper surface of glass substrate 2, which is a second glass position, being an opposite surface of the surface of molding die 64 to press the resin.

Figure 18A:
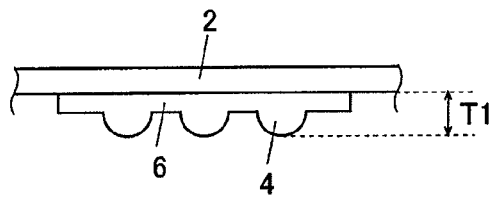
FIG. 18 is a view to explain the thickness of the wafer lens on the optical axis.

In this case, as shown in FIG. 18(a), when thickness T1 of convex lens section 4 is controlled to be constant, the height of molding die 64 is corrected by Z-axis moving mechanism 300 (being motor 306) in imprint step S5 of the second cycle or later, based on the height of point A and the height of point B, which are the thickness, other than the thickness of the lens section to be determined without variation, concerning the depth of the molding die.

That is, since the arrangement of molding die 64 for thickness T1 (being an designated value) was previously memorized in control device 500 as an initial value, the arrangement of molding die 64 is determined based on the initial value, in the imprint process in the first cycle. After that, in sensing step S10, the height of point A and the height of point B are measured, so that the thickness of non-lens section 6 can be calculated based on the height of point A and the height of point B. By the calculated thickness, thickness T1 after curing, (being an actual measurement value) for the arrangement of molding die 64, is calculated. Due to these actions, the difference, which is between thickness T1 as the designated value and thickness T1 after curing, can be calculated. In imprint step S5 of the second cycle or later, the arrangement of molding die 64 (which is a position in the direction of the Z-axis) is changed slightly to correct said difference.

Due to the correction of the arrangement of molding die 64, molding die 64 can be supported at the constant clearance against the lower surface of glass substrate 2, and thickness T1, being the thickness on the optical axis, can be obtained as a constant value. Further, when no convex lens sections 4 were molded in the first cycle, or when glass substrate 2 were changed because convex lens sections were fully molded for glass substrate 2, the distance, which is between molding die 64 and the lower surface of glass substrate 64 before changing, can be supported as it stands. Accordingly, thickness T1 of convex lens section 4, being the thickness on the optical axis, can be controlled constantly.

In the above-described explanation, the structure to control only the correction of the distance has been detailed, however, the correction of the amount of resin dropped onto the molding surface of molding die 64 can be included in the above correction.

The amount of correction in this case can be weighted as detailed below, in which "a" represents a correction coefficient.

Correction Amount of Distance=a×(a distance between molding die 64 and the opposite surface of resin pressing surface of glass substrate 2), Dropping Amount of Resin=(1−a)×(above detailed distance between the gaps).

Figure 18B:
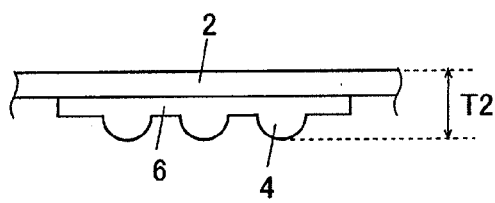

As shown in FIG. 18(b), when thickness T2, in which convex lens section 4 (being a resin portion) and glass substrate 2 are included, is controlled to be constant, dispenser 32 is controlled so that the amount of resin to be dropped into molding die 64 is corrected, in dispensing step S3 in the second cycle or later.

That is, since the dropping amount of resin into molding die 64 for thickness T2 (being an designated value) is previously memorized in control device 500 as an initial value, the dropping amount of resin into molding die 64 is determined based on the initial value, in the dispense process in the first cycle.

After that, in sensing step S10, the height of point A and the height of point B are scanned to be measured, while the flat surface of molding die 64 is scanned while molding die 64 and the opposite surface of the resin pressing surface of glass substrate 2 are kept parallel at a predetermined distance. By a difference between the distance of measured A-B positions and the above described constant distance, thickness T2 after curing (being an actual measurement value) is calculated. Due to these actions, the difference, which is between thickness T2 before curing and thickness T2 after curing, can be calculated. In dispensing step S3 of the second cycle or later, the dropping amount of resin is changed slightly to correct for said difference.

Further, to keep a predetermined distance while keeping the flat surface of molding die 64 and the opposite surface of the resin pressing surface of glass substrate 2 parallel, a structure can be used, in which molding die 64 is shifted slightly in direction Z, while point C is scanned and measured to be kept at a constant height.

Due to the correction of the dropping amount of resin as detailed above, after the process of separation step S7 in the second cycle or later, the volume (being "area"×"thickness"), in which convex lens section 4 and glass substrate 2 corresponding to said section are included, can be kept constantly, so that thickness T2, being the thickness on the optical axis, can be made to be constant.

After the predetermined number of convex lens sections 4 have been formed on glass substrate 2, air slide guide mechanisms 120, 130, 230, 240 and 320 are activated, so that XY-stage 30 and Z-stage 304 shift to the predetermined positions. Finally, cover 42 is removed from XY-stage 30, and glass substrate 2 is ejected (which is ejection step S8).

By the above detailed process, wafer lenses 1 can be produced. Since the lenses produced in the first cycle are based on the designated value, that is, they are not corrected by the actual measurement values, they should be destroyed basically. However, after the lenses are checked, if they are within the limits, they can be used.

In the present embodiment, convex lens section 4 is produced on glass substrate 2, which is a similar glass substrate in the first cycle process and the second cycle process or later. However, different glass substrates 2 can be used in the first cycle process and the second cycle process or later. That is, glass substrate 2 for the test can be used in the first cycle process, while glass substrate 2 for production of the wafer lenses can be used in the second cycle process or later.

Figure 19:
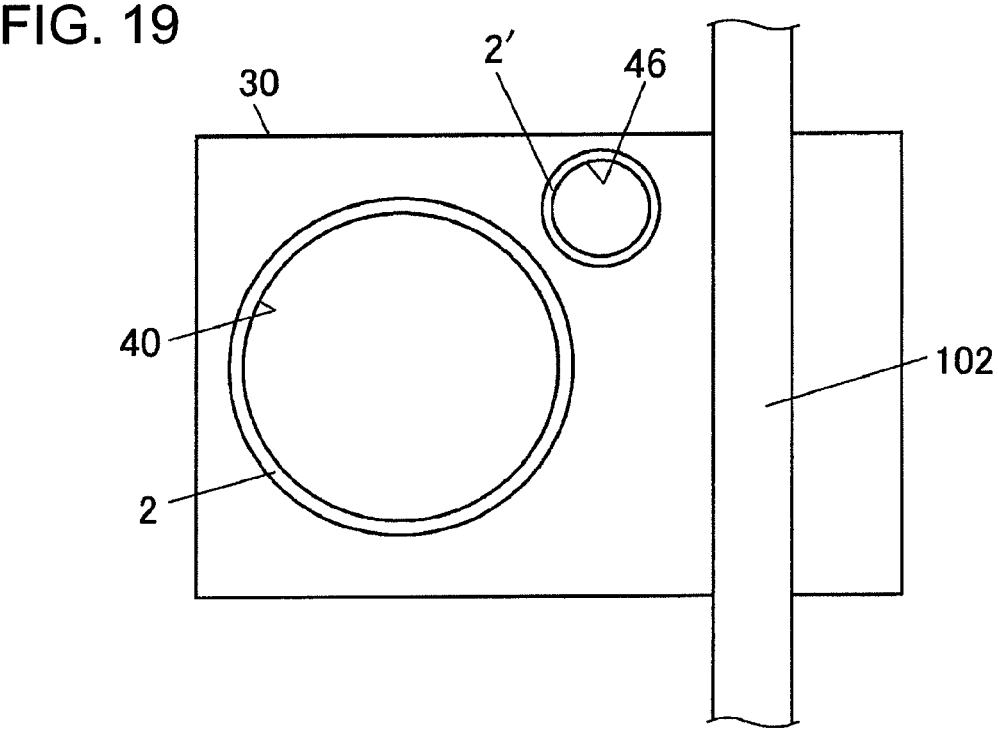
FIG. 19 is an outline plane view to show a variation of the producing device of the wafer lenses shown in FIGS. 3 and 4.

In this case, as shown in FIG. 19, through-hole 40 and through-hole 46, exhibiting a diameter smaller than that of thorough-hole 40, are formed on XY-stage 30. Glass substrate 2', which is a substrate for the test, is formed on through-hole 46, while glass substrate 2, which substrate is for the production of the wafer lenses, is formed on through-hole 40. Further, in each process of the first cycle, convex lens sections 4 are formed on glass substrate 2' for the test, after that, the heights of point A, point B, and point C are measured. In each process of the second cycle, or later based on the heights of point A, point B, and point C, which are measured using glass substrate 2', convex lens sections 4 are successively produced on glass substrate 2, which substrate is for the production of the wafer lenses.

In the present embodiment, an example to produce wafer lens 1 has been shown, further, the present embodiment can also be applied in case that a sub-master for the production of wafer lens 1 is formed. The sub-master is a molded resin die which is formed by molding die 64 serving as a mother die. Basically, the sub-master represents a concavity and convexity body of resin formed on glass substrate 2, which is basically the same as convex lens sections 4 formed on glass substrate 2. Since the use of the sub-master can reduce the number of expensive master molding dies, it is not necessary to re-produce the master molding die, which results in overall cost saving of the wafer lenses.

As shown in FIG. 18(a), the method, in which the arrangement of molding die 64 is corrected while thickness T1 is controlled to be constant, is effective for the production of wafer lenses 1, because thickness T1 of convex lens sections 4 can be determined to be constant, while the lower surface of glass substrate 2 is set as the basis.

As shown in FIG. 18(b), the method, in which the dropping amount of resin is corrected while thickness T2 is controlled to be constant, is effective for the production of the sub-master, because thickness T2 of convex lens sections 4 and glass substrate 2 can be determined to be constant, while the upper surface of glass substrate 2 is set as the basis.

In the present embodiment, an example has been shown in which convex lens sections 4 are subsequently formed on glass substrate 2, by a unit of the molding die, which is a "step and repeat method". However, a molding die, exhibiting a large diameter, corresponding to the size (being the area) of glass substrate 2, can also be used, instead of molding die 4, which is a so-called "package method". When the package method is applied in Embodiment 1, the first glass substrate is molded as a dummy for measuring the thickness, and the wafer lenses, molded in the second cycle or later, become finished products. Application of the package method is particularly effective, when the glass substrate is relatively thick, exhibiting no curl, and when the accuracy of the thickness of each glass substrate is high.

In the present embodiment, areas adjacent to glass substrate 2 are locally controlled to be under reduced pressure condition, from dispensing step S3 to separation step S7. In both cases of the step and repeat method and the packaged method, the entirety of wafer lens producing device 10 (excluding control device 500) can be installed in a closed system such as a chamber, so that wafer lens producing device 10, including the areas adjacent to glass substrate 2, is entirely installed under the reduced pressure condition.

In the above described embodiment, the pressure within empty space section 400 is reduced in the steps from imprinting step S5 to light exposing step S6. However, it is also possible to make a structure in which, the pressure within only lower empty space section 404 is decreased, while continuous hole 3, formed in glass substrate 2, is not.

In this case, as shown by the dashed lines in FIG. 14, at least one step among dispensing step S3, imprinting step S5, and light exposing step S6, should be released to atmospheric pressure.

In case that the resin is filled under the reduced pressure condition in dispensing step S3, air bubbles can be effectively prevented from entering the resin, however, the air bubbles tend to be adversely generated by the surface tension of the resin. To overcome this situation, after the reduced pressure condition is made, if the resin is opened to atmospheric pressure, the generation of the air bubbles can be effectively prevented, whereby the resin fills every portion of cavity 65.

In case that both of upper empty space section 402 and lower empty space section 404 are under the reduced pressure condition, no pressure difference exists between upper empty space section 402 and lower empty space section 404, whereby air bubbles are prevented from entering the resin. For example, if upper empty space section 402 is controlled to be under atmospheric pressure, while lower empty space section 404 is controlled to be under the reduced pressure condition, glass substrate 2 curls or deforms by the pressure difference. Accordingly, in case that upper empty space section 402 and lower empty space section 404 are changed from the reduced pressure condition to the atmospheric condition, glass substrate 2 can be kept as a flat surface, so that the imprint operation can be conducted on the flat surface.

In case that the resin is exposed under reduced pressure conditions in light exposing step S6, oxygen inhibition against the resin is prevented, so that the resin can be assuredly cured, and the resin is then released to atmospheric condition, the transcription is more effectively improved. The release to the atmospheric pressure during these steps are shown by the chained lines in FIG. 14.

[Embodiment 2]

Embodiment 2 differs from Embodiment 1 on points described below, but equals Embodiment 1 on further points.

Figure 20:
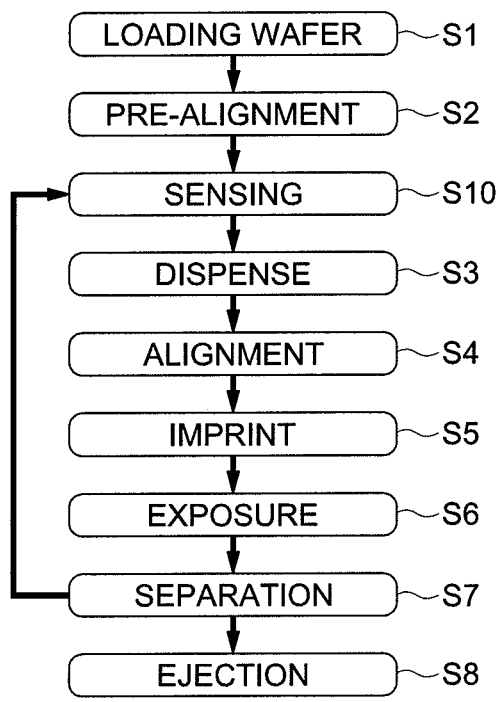
FIG. 20 is a flow chart to explain the outline of a producing method of the wafer lenses, relating to a preferable second embodiment of the present invention.

As shown in FIG. 20, on the wafer producing method, process of sensing step S10 is conducted between pre-alignment step S2 and dispensing step S3, and processes conducted between sensing step S10 and separation step S7 are determined to be one cycle.

In sensing step S10, as shown in FIGS. 17(a) and 17(b), measured are the heights of point A (being a non-lens section), point B (being a surface of glass substrate 2 against which resin is pressed by molding die 64), and point C (being a surface of glass substrate 2 opposed to said surface of point B). Actually, on the first cycle of the step and repeat method, or on the first sheet conducted by the package method, point B and point C are measured at plural points on the glass substrate, and points B and C are memorized. Subsequently, on the second cycle or later, of the step and repeat method, or on the second sheet or later, of the package method, point A is measured, so that positional correction of the molding die can be conducted.

As shown in FIG. 18(a), when thickness T1 of convex lens section 4 is controlled to be constant, in imprint step S5 of each cycle, Z-axis moving mechanism 300 (being motor 306) is controlled based on the heights of point A and point B, which heights were measured in sensing step S10 in a cycle just before said each cycle, so that the height of molding die 64 can be corrected.

Figure 21A:
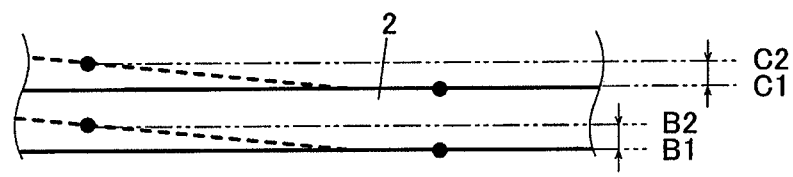
FIG. 21 is a view to explain the fluctuation of curling and the fluctuation of thickness, of the glass substrate.
Figure 21B:
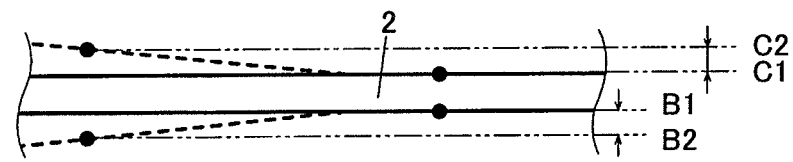

For example, as shown in FIG. 21, the height of point B, measured in sensing step S10 of the first cycle, is referred to as B1, and the height of point B, measured in sensing step S10 of the second cycle, is referred to as B2. In this case, if glass substrate 2 is transformed to be curled (see FIG. 21(a)), or if the thickness of glass substrate 2 varies widely (see FIG. 21(b)), a gap is generated between B1 and B2, whereby a gap of glass substrate 2 can be calculated between the first cycle and the second cycle. As a result, in imprint step S5 of the second cycle, the arrangement of molding die 64 in imprint step S5 of the first cycle is changed by a slight amount, corresponding to said gap.

Due to the correction of the arrangement of molding die 64 as detailed above, in imprint step S5 of each cycle, molding die 64 can be supported to keep a constant distance from the bottom surface of glass substrate 2, so that thickness T1, as the thickness on the optical axis, can be controlled to be constant. Further, since comparison to point B measured in the just before cycle is conducted in each cycle, thickness T1 can be certainly controlled to be constant, even if glass substrate 2 is deformed to be expanded or contracted, due to the heat generated by the operation of wafer producing device 10.

On the other hand, as shown in FIG. 18(b), when thickness T2 of convex lens section 4 (being a resin portion) including glass substrate 2 is controlled to be constant, in dispensing step S3 of each cycle, dispenser 32 is controlled based on the heights of point A and point C, which heights were measured in sensing step S10 in a cycle just before said each cycle, so that the amount of resin to be dropped into molding die 64 is corrected.

For example, as shown in FIG. 21, the height of point C measured in sensing step S10 of the first cycle is referred to as C1, and the height of point C measured in sensing step S10 of the second cycle is referred to as C2. In this case, if glass substrate 2 is transformed to be curled (see FIG. 21(a)), or if the thickness of glass substrate 2 varies widely (see FIG. 21(b)), a gap is generated between C1 and C2, whereby the gap length of glass substrate 2 can be calculated between the first cycle and the second cycle. As a result, in dispensing step S3 of the second cycle, the amount of resin to be dropped into molding die 64, in dispensing step S3 of the first cycle, is changed by a slight amount, corresponding to said gap.

In the present embodiment, a structure can be used in which each height of point B is scanned and measured, while the flat surface of molding die 64 and the opposed surface of the resin pressing surface of glass substrate 2 are kept parallel by a predetermined distance, whereby variability of the thickness T of glass substrate 2 can be measured.

Due to the correction of the dropping amount of resin as detailed above, in each cycle, the volume (being "area"× "thickness"), in which convex lens section 4 and glass substrate 2 corresponding to said section are included, can be kept constantly, so that thickness T2, being the thickness on the optical axis, can be made to be constant. Further, since comparison to point C measured in the just before cycle is conducted in each cycle, thickness T2 can be certainly controlled to be constant, even if glass substrate 2 is deformed to be expanded or contracted, due to the heat generated by the operation of wafer producing device 10.

In the present embodiment, the gap length of glass substrate 2 is calculated in each cycle, so that the arrangement of molding die 64 and the dropping amount of resin are corrected. However, it is also possible to correct them in such a way that before forming convex lens section 4, on all areas or some arbitrarily areas of glass substrate 2, onto which molding die 64 is pressed (see AR1 to 3 in FIG. 1), the heights of point B and point C are set to standard heights, whereby the gap length of glass substrate 2 is calculated, so that the arrangement of molding die 64 and the dropping amount of resin are corrected.

Figure 22:
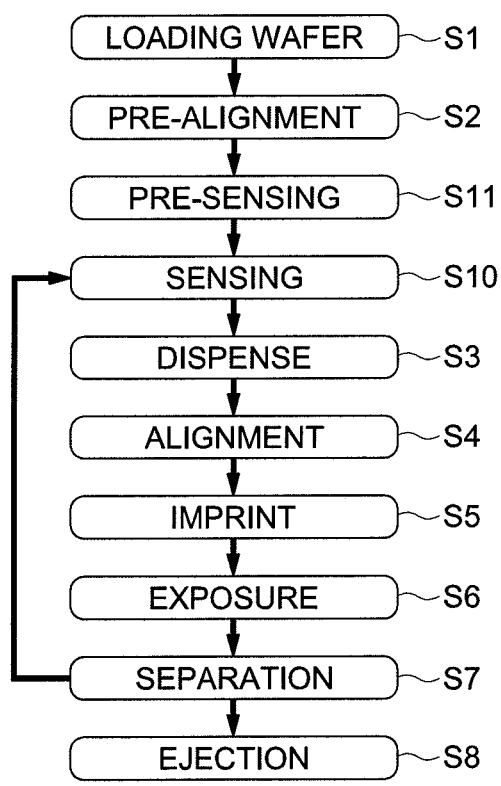
FIG. 22 is a flow chart to explain the outline of a producing method of the wafer lenses, relating to a preferable embodiment as a variation of the present invention.

FIG. 22 is a flow chart to detail the above detailed way, in which pre-sensing step S11 is conducted after pre-alignment step S2. In this pre-sensing step S11, the above detailed measurements of the heights of point B and point C are conducted on all areas or some arbitrarily areas of glass substrate 2. The data of the heights, measured in this step, are memorized in the memory, and are used for the correction of the pressing position of the molding die, or the dropping amount of resin, while referring to the height of point A, measured in sensing step S10 of each cycle.

As a further varied way, it is also possible to use a way in which data limiting to point B and point C are used for the correction of the pressing position of the molding die, or the dropping amount of resin. In this case, curled glass substrate or varied thickness of the glass substrate can be corrected.

EXPLANATION OF THE NUMERIC SYMBOLS 1 wafer lens
2 glass substrate
3 continuous hole
4 convex lens section
6 non-lens section
10 device for producing wafer lenses 20 bed
30 XY-stage
31 projected section
32 dispenser
33 needle section
34 laser length measuring machine
36 microscope
38 continuous hole
40 and 46 through-hole
42 cover section
44 light source
50 molding die section
52 first supporting plate
54 piezo actuator
56 second supporting plate
58 pressure sensor
60 third supporting plate
θ-stage
64 molding die
65 cavity
66 screw
68 plate spring
70 screw
72 optical sensor
100 X-axis moving mechanism
102 X-axis guide
110 linear motor
112 stator
114 rotor
116 scale
118 sensor
120 and 130 air slide guide mechanism
122, 132 and 136 ejection hole
134 suction hole
200 Y-axis moving mechanism
202 Y-axis guide 202
204 and 206 end portion
210 Y-axis moving body
212 and 214 hooking section
220 linear motor
222 stator
224 rotor
226 scale
230 and 240 air slide guide mechanism
232, 234, 236, 242, 244 and 246 ejection hole
300 Z-axis moving mechanism
302 Z-axis guide
304 Z-stage
306 motor
308 shaft
310 clearance
320 air slide guide mechanism
322, 324, 326 and 328 ejection hole
330 sealing member
400 empty space section
402 upper empty space section
404 lower empty space section
406 empty space section
410 decompression mechanism
500 control device

The invention claimed is:

1. A method of producing wafer lenses comprising:
dispensing photo-curable resin into a molding die structured of a flat surface and a molding surface arranged on the flat surface;
imprinting so that one of the molding die and a glass substrate is pressed against the other;
exposing the photo-curable resin to light rays after the imprinting; and
releasing the glass substrate from the molding die;
wherein a single cycle, including processes from the dispensing to the releasing, is conducted at a first position of the glass substrate, after that, the molding die is moved relatively with respect to the glass substrate, the single cycle is performed again at a second position of the glass substrate, and the above cycle is repeated plural times so that resin lenses are sequentially molded on the glass substrate,
wherein the method of producing wafer lenses further comprises:
between the releasing in a first cycle and the dispensing in a second cycle, measuring a distance between a non-lens position of a non-lens area surrounding the resin lenses and a first glass position of a glass surface, which is a surface of the glass substrate against which the resin is pressed by the molding die, and
in the imprinting in the second cycle or later, correcting a pressing position of the molding die against the glass substrate, based on the distance measured by the measuring.

2. The method of producing the wafer lenses of claim 1, wherein a dropping amount of the photo-curable resin onto the molding die is corrected based on the distance measured by the measuring.

3. The method of producing wafer lenses of claim 1, wherein measurement of the distance is calculated by such ways that the non-lens position of the non-lens area surrounding a lens section is detected, and that the first glass position which is a surface of the glass substrate against which the resin is pressed by the molding die, is detected.

4. A method of producing wafer lenses comprising:
dispensing photo-curable resin into a molding die structured of a flat surface and a molding surface arranged on the flat surface;
imprinting so that one of the molding die and a glass substrate is pressed against the other;
exposing the photo-curable resin to light rays after the imprinting; and
releasing the glass substrate from the molding die;
wherein a single cycle, including processes from the dispensing to the releasing, is conducted at a first position of the glass substrate, after that, the molding die is moved relatively with respect to the glass substrate, the single cycle is performed again at a second position of the glass substrate, and the above cycle is repeated plural times so that resin lenses are sequentially molded on the glass substrate,
wherein the method of producing wafer lenses further comprises:
between the releasing in a first cycle and the dispensing in a second cycle, detecting a position of a non-lens area surrounding the resin lenses and a second glass position which is an opposite surface of a second glass substrate against which the photo-curable resin is pressed by the molding die, calculating a distance between the non-lens area and the second glass position, and
in the dispensing in the second cycle or later, correcting a dropping amount of resin into the molding die, based on the distance calculated by the calculating.

5. The method of producing wafer lenses of claim 4, wherein measurement of the distance in the calculating is conducted while the flat surface of the molding die is scanned so that the molding die and an opposite surface of a resin pressing surface of the glass substrate are kept in parallel at a predetermined distance.

6. A method of producing wafer lenses comprising:
dispensing photo-curable resin into a molding die structured of a flat surface and a molding surface arranged on the flat surface;
imprinting so that one of the molding die and a glass substrate is pressed against the other;
exposing the photo-curable resin to light rays after the imprinting; and
releasing the glass substrate from the molding die;
wherein a single cycle, including processes from the dispensing to the releasing, is conducted at a first position of the glass substrate, after that, the molding die is moved relatively with respect to the glass substrate, the single cycle is performed again at a second position of the glass substrate, and the above cycle is repeated plural times so that resin lenses are sequentially molded on the glass substrate,
wherein the method of producing wafer lenses further comprises:
after the releasing on a preceding cycle of each cycle, measuring a distance between a non-lens area surrounding the resin lenses and a first glass position, which is a surface of the glass substrate against which the photo-curable resin is pressed by the molding die, and
during the imprinting in each cycle, correcting a pressing position of the molding die, based on the distance measured by the measuring.

7. The method of producing wafer lenses of claim 6, wherein a dropping amount of the photo-curable resin onto the molding die is corrected based on the distance measured by the measuring.

8. The method of producing wafer lenses of claim 6, wherein measurement of the distance is calculated by such ways that the position of the non-lens area surrounding a lens section is detected, and that the position of a first glass position which is on a surface against which the photo-curable resin is pressed by the molding die of the glass substrate is detected.

9. A method of producing wafer lenses comprising:
dispensing photo-curable resin into a molding die structured of a flat surface and a molding surface arranged on the flat surface;
imprinting so that one of the molding die and a glass substrate is pressed against the other;
exposing the photo-curable resin to light rays after the imprinting; and
releasing the glass substrate from the molding die;
wherein a single cycle, including processes from the dispensing to the releasing, is conducted at a first position of the glass substrate, after that, the molding die is moved relatively with respect to the glass substrate, the single cycle is performed again at a second position of the glass substrate, and the above cycle is repeated plural times so that resin lenses are sequentially molded on the glass substrate,
wherein the method of producing wafer lenses further comprise:
after the releasing on a preceding cycle of each cycle, and before the dispensing of a next cycle,
detecting a position of a non-lens area surrounding the resin lenses, and a second glass position which is an opposite surface against which the photo-curable resin is pressed by the molding die, and measuring a distance between said non-lens area and the second glass position, and
during the dispensing of the next cycle, correcting a dropping amount of resin into the molding die, based on the distance measured by the measuring.

10. The method of producing wafer lenses of claim 9, wherein a measurement of the distance is conducted so that the flat surface of the molding die is scanned while the molding die and an opposite surface of a resin pressing surface of the glass substrate are kept in parallel at a predetermined distance.

11. A method of producing wafer lenses comprising:
dispensing photo-curable resin into a molding die structured of a flat surface and a molding surface arranged on the flat surface;
imprinting so that one of the molding die and a glass substrate is pressed against the other;
exposing the photo-curable resin to light rays after the imprinting; and
releasing the glass substrate from the molding die;
wherein a single cycle, including processes from the dispensing to the releasing, is conducted on a single glass substrate, after that, the glass substrate is changed to a new one to conduct the single cycle again, whereby the above single cycle is repeated plural times so that the resin lenses are formed sequentially on plural glass substrates,
wherein the method of producing wafer lenses further comprises:
between the releasing in a first cycle and the dispensing in a second cycle, measuring a distance between a non-lens position of a non-lens area surrounding the resin lenses and a first glass position of a glass surface which is a surface of the glass substrate against which the photo-curable resin is pressed by the molding die, and
in the imprinting in the second cycle or later, correcting a pressing position of the molding die against the glass substrate, based on the distance measured by the measuring.

12. The method of producing wafer lenses of claim 11, wherein a dropping amount of the photo-curable resin onto the molding die is corrected based on the distance measured by the measuring.

13. The method of producing wafer lenses of claim 11, wherein measurement of the distance is calculated by such ways that the position of the non-lens section around a lens section is detected, and that the position of a first glass position which is on a surface against which the photo-curable resin is pressed by the molding die of the glass substrate is detected.

14. A method of producing wafer lenses comprising:
dispensing photo-curable resin into a molding die structured of a flat surface and a molding surface arranged on the flat surface;
imprinting so that one of the molding die and a glass substrate is pressed against the other;
exposing the photo-curable resin to light rays after the imprinting; and
releasing the glass substrate from the molding die;
wherein a single cycle, including processes from the dispensing to the releasing, is conducted on a single glass substrate, after that, the glass substrate is changed to a new one to conduct the single cycle again, whereby the above single cycle is repeated plural times so that the resin lenses are formed sequentially on the plural glass substrates, wherein the method of producing wafer lenses further comprise:

between the releasing in a first cycle and the dispensing in a second cycle, detecting a position of a non-lens area surrounding the resin lenses and a second glass position an opposite surface a second glass substrate against which the photo-curable resin is pressed by the molding die, and calculating a distance between the non-lens area and the second glass position, and in the dispensing in the second cycle or later, correcting a dropping amount of the photo-curable resin into the molding die, based on the distance calculated by the calculating.

15. The method of producing wafer lenses of claim 14, wherein measurement of the distance in the calculating is conducted so that the flat surface of the molding die is scanned while the molding die and an opposite surface of a resin pressing surface of the glass substrate are kept in parallel at a predetermined distance.

16. A method of producing wafer lenses comprising:

dispensing photo-curable resin into a molding die structured of a flat surface and a molding surface arranged on the flat surface;

imprinting so that one of the molding die and a glass substrate is pressed against the other;

exposing the photo-curable resin to light rays after the imprinting; and releasing the glass substrate from the molding die;

wherein a single cycle, including processes from the dispensing to the releasing, is conducted on a single glass substrate, after that, the glass substrate is changed to a new one to conduct the single cycle again, whereby the above single cycle is repeated plural times so that the resin lenses are formed sequentially on the plural glass substrates, wherein the method of producing wafer lenses further comprises:

after the releasing on a preceding cycle of each cycle, measuring a distance between a non-lens area surrounding the resin lenses and a first glass position, which is a surface of the glass substrate against which the photo-curable resin is pressed by the molding die, and during the imprinting in each cycle, correcting a pressing position of the molding die, based on the distance measured by the measuring.

17. The method of producing wafer lenses of claim 16, wherein a dropping amount of the photo-curable resin onto the molding die is corrected based on the distance measured by the measuring.

18. The method of producing wafer lenses of claim 16, wherein measurement of the distance is calculated by such ways that the position of the non-lens area surrounding a lens section is detected, and that the position of a first glass position which is on a surface against which the photo-curable resin is pressed by the molding die of the glass substrate is detected.

19. A method of producing wafer lenses comprising:

dispensing photo-curable resin into a molding die structured of a flat surface and a molding surface arranged on the flat surface;

imprinting so that one of the molding die and a glass substrate is pressed against the other;

exposing the photo-curable resin to light rays after the imprinting; and releasing the glass substrate from the molding die;

wherein a single cycle, including processes from the dispensing to the releasing, is conducted on a single glass substrate, after that, the glass substrate is changed to a new one to conduct the single cycle again, whereby the above single cycle is repeated plural times so that the resin lenses are formed sequentially on plural glass substrates, wherein the method of producing wafer lenses further comprises:

after the releasing on a preceding cycle of each cycle, and before the dispensing of a next cycle, detecting a position of a non-lens area surrounding the resin lenses and a second glass position, which is an opposite surface against which the photo-curable resin is pressed by the molding die, and measuring a distance between the non-lens area and the second glass position, and during the dispensing of the next cycle, correcting a dropping amount of the photo-curable resin into the molding die, based on the distance calculated by the measuring.

20. The method of producing wafer lenses of claim 19, wherein measurement of the distance is conducted so that the flat surface of the molding die is scanned while the molding die and an opposite surface of a resin pressing surface of the glass substrate are kept in parallel at a predetermined distance.

21. A method of producing wafer lenses comprising:

dispensing photo-curable resin into a molding die structured of a flat surface and a molding surface arranged on the flat surface;

imprinting so that one of the molding die and a glass substrate is pressed against the other;

exposing the photo-curable resin to light rays after the imprinting; and releasing the glass substrate from the molding die;

wherein a single cycle, including processes from the dispensing to the releasing, is conducted at a first position of the glass substrate, after that, the molding die is moved relatively with respect to the glass substrate, the single cycle is performed again at a second position of the glass substrate, and the above cycle is repeated plural times so that resin lenses are sequentially molded on the glass substrate, wherein the method of producing wafer lenses further comprises:

pre-sensing for measuring a first glass position of the glass surface, which is on a surface of the glass substrate against which the photo-curable resin is pressed by the molding die, and a second glass position which is a surface of the glass substrate against which the photo-curable resin pressed by the molding die, at plural positions of the glass substrate, before conducting a single cycle;

between the releasing in the first cycle and the dispensing in the second cycle, measuring a non-lens area surrounding the resin lenses, and calculating a distance between a position of the non-lens area and the first glass position measured in the pre-sensing, or a distance between the non-lens area and the second glass position measured in the pre-sensing;

in the imprinting in a second cycle or later, correcting a pressing position of the molding die, or correcting a dropping amount of resin into the molding die, in the imprinting, based on the distance measured in the measuring.

22. The method of producing wafer lenses of claim 21, wherein in the pre-sensing, the plural positions for measuring the glass substrate comprise positions on the glass substrate which is relatively moved in each cycle.

23. A method of producing wafer lenses comprising:

dispensing photo-curable resin into a molding die structured of a flat surface and a molding surface arranged on the flat surface;

imprinting so that one of the molding die and a glass substrate is pressed against the other;

exposing the photo-curable resin to light rays after the imprinting; and releasing the glass substrate from the molding die;

wherein a single cycle, including processes from the dispensing to the releasing, is conducted on a single glass substrate, after that, the glass substrate is changed to a new one to conduct the single cycle again, whereby the above single cycle is repeated plural times so that the resin lenses are formed sequentially on the plural glass substrates, wherein the method of producing wafer lenses further comprise:

pre-sensing for measuring a first glass position of a glass surface, which is on a surface of the glass substrate, against which the photo-curable resin is pressed by the molding die, and a second glass position which is on a surface of the glass substrate against which the photo-curable resin pressed by the molding die, at plural positions of the glass substrate, before conducting a single cycle;

after the releasing in the preceding cycle of each cycle, and before the dispensing of a next cycle, measuring a non-lens position of a non-lens area surrounding the resin lenses, and calculating a distance between the non-lens area and the first glass position measured in the pre-sensing, or calculating a distance between the non-lens position and the second glass position, and in the imprinting in the second cycle or later, correcting a pressing position of the molding die, or correcting a dropping amount of resin into the molding die, in the imprinting, based on the distance measured in the calculating.

* * * * *